US012683738B2

(12) United States Patent
Liu et al.

(10) Patent No.: US 12,683,738 B2
(45) Date of Patent: Jul. 14, 2026

(54) NODE DEVICE USED FOR WIRELESS COMMUNICATION, AND METHOD IN NODE USED FOR WIRELESS COMMUNICATION

(71) Applicant: Quectel Wireless Solutions Co., Ltd., Shanghai (CN)

(72) Inventors: Zheng Liu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 308 days.

(21) Appl. No.: 18/467,978

(22) Filed: Sep. 15, 2023

(65) Prior Publication Data

US 2024/0007246 A1     Jan. 4, 2024

Related U.S. Application Data

(63) Continuation of application No. PCT/CN2021/125390, filed on Oct. 21, 2021.

(30) Foreign Application Priority Data

Mar. 18, 2021    (CN) .......................... 202110288342.8

(51) Int. Cl.
H04L 5/00          (2006.01)
H04W 72/0453     (2023.01)
(Continued)

(52) U.S. Cl.
CPC ....... H04L 5/0048 (2013.01); H04W 72/0453 (2013.01); H04W 72/1273 (2013.01); H04W 72/542 (2023.01)

(58) Field of Classification Search
CPC . H04B 7/06968; H04L 1/0025; H04L 1/0026; H04L 1/0031; H04L 5/0048; H04W 72/0453; H04W 72/1273; H04W 72/542
See application file for complete search history.

(56) References Cited

U.S. PATENT DOCUMENTS

2012/0314676 A1* 12/2012 Koo ..................... H04B 7/0473
                                                              370/329
2020/0007270 A1*  1/2020 Wikström ............. H04L 5/0057
(Continued)

FOREIGN PATENT DOCUMENTS

CN        102687438 A      9/2012
CN        111865476 A     10/2020
(Continued)

OTHER PUBLICATIONS

Extended European Search Report issued in counterpart European Patent Application No. 21931218.8, dated Aug. 14, 2024.
(Continued)

*Primary Examiner* — Benjamin H Elliott, IV
(74) *Attorney, Agent, or Firm* — Westbridge IP LLC

(57)          ABSTRACT

A method includes: receiving a first reference signal group, and transmitting a first information block. The first information block is generated by measuring the first reference signal group. The first information block includes K channel quality indications corresponding to K first type values, respectively. A first channel quality indication is any channel quality indication in the K channel quality indications. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first value is the first type value corresponding to the first channel quality indication.

18 Claims, 5 Drawing Sheets

(51) Int. Cl.
  *H04W 72/1273* (2023.01)
  *H04W 72/542* (2023.01)

(56) References Cited

U.S. PATENT DOCUMENTS

| | | | | |
|---|---|---|---|---|
| 2021/0194652 | A1* | 6/2021 | Khoryaev | H04L 5/06 |
| 2022/0038921 | A1* | 2/2022 | Wu | H04W 16/28 |
| 2022/0045789 | A1* | 2/2022 | Karmoose | H04L 1/0041 |
| 2022/0046644 | A1* | 2/2022 | Oh | H04L 5/0048 |
| 2023/0049978 | A1* | 2/2023 | Wu | H04W 72/0446 |
| 2023/0132263 | A1* | 4/2023 | Ye | H04W 72/12 |
| | | | | 370/329 |
| 2023/0216568 | A1* | 7/2023 | Zhang | H04L 1/1822 |
| | | | | 370/252 |
| 2023/0344598 | A1* | 10/2023 | Wang | H04L 5/0058 |
| 2023/0412226 | A1* | 12/2023 | Hindy | H04B 7/024 |
| 2024/0007246 | A1* | 1/2024 | Liu | H04L 5/0048 |

FOREIGN PATENT DOCUMENTS

| | | | |
|---|---|---|---|
| CN | 112291851 | A | 1/2021 |
| CN | 112398619 | A | 2/2021 |
| CN | 113507343 | A | 10/2021 |
| EP | 3637838 | A1 | 4/2020 |
| WO | 2018064182 | A1 | 4/2018 |
| WO | 2020168907 | A1 | 8/2020 |
| WO | 2020216015 | A1 | 10/2020 |
| WO | 2021023038 | A1 | 2/2021 |

OTHER PUBLICATIONS

Ericsson, R2-1913414 Text Proposal for MAC specification on Quality Report, 3GPP tsg_ran\wg2, dated Oct. 18, 2019.

Hu et al., CQI measurement based on CSI-RS, Guangdong Communication Technology, 2016, pp. 35-38, dated Nov. 30, 2016.

International Search Report and Written Opinion issued in corresponding PCT Application No. PCT/CN2021/125390, dated Jan. 24, 2022.

Wang et al., An Efficient Design of LTE Reference Signal and Performance Analysis, Journal of China University of Metrology, 2011, 22(4), pp. 373-381, dated Dec. 31, 2011.

* cited by examiner

100

5GS/EPS 200

Time domain position of first reference resource block —be associated with→ Time domain position of first information block First type value#0    · · ·    First type value#(K-1)

First type value#0    · · ·    First type value#(K-1)

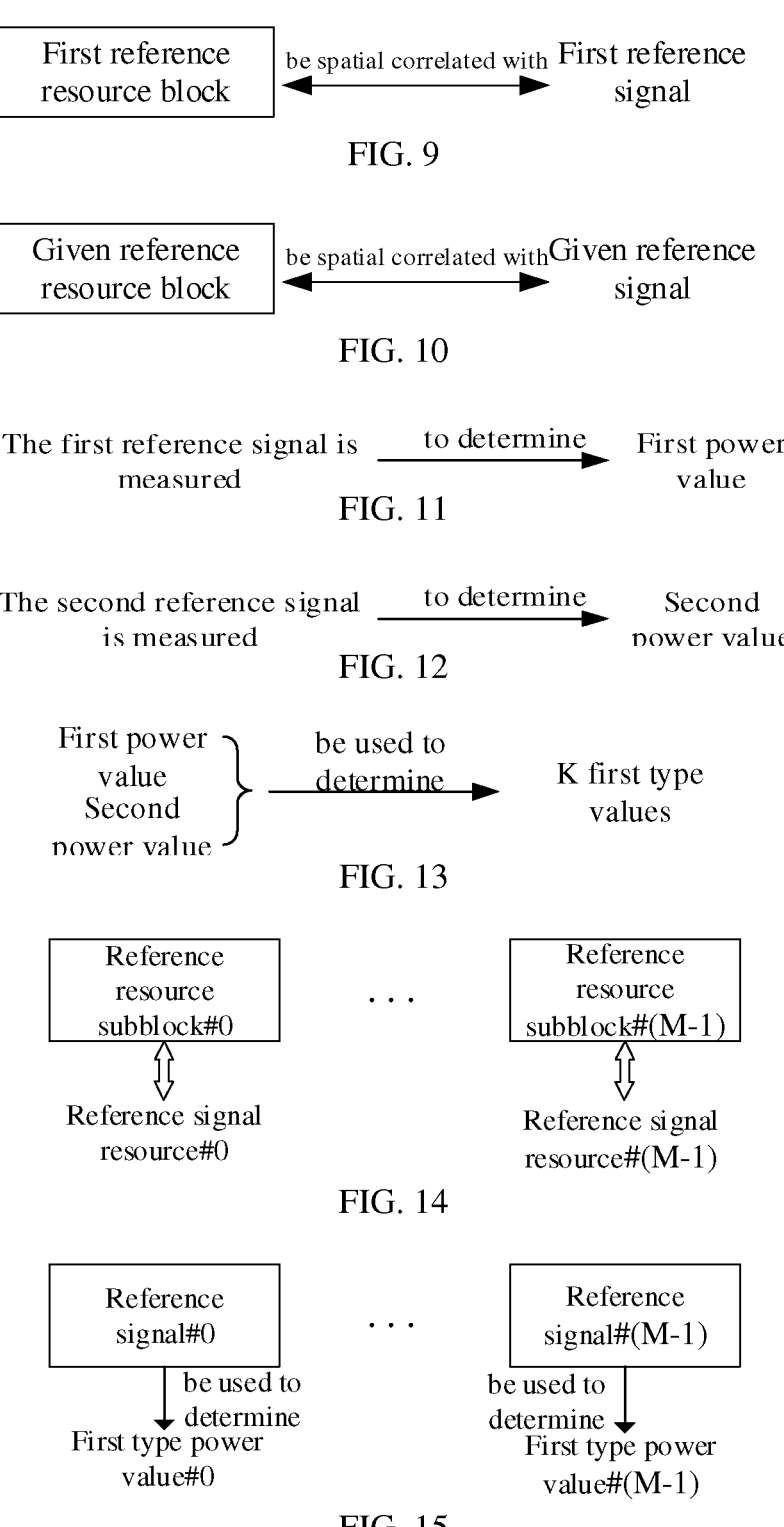

| First reference resource block | be spatial correlated with | First reference signal |

FIG. 9

| Given reference resource block | be spatial correlated with | Given reference signal |

FIG. 10

The first reference signal is measured → to determine → First power value

FIG. 11

The second reference signal is measured → to determine → Second power value

FIG. 12

First power value
Second power value
} be used to determine → K first type values

FIG. 13

| Reference resource subblock#0 | . . . | Reference resource subblock#(M-1) |

Reference signal resource#0          Reference signal resource#(M-1)

FIG. 14

| Reference signal#0 | . . . | Reference signal#(M-1) | be used to determine
First type power value#0 be used to determine
First type power value#(M-1)

FIG. 15

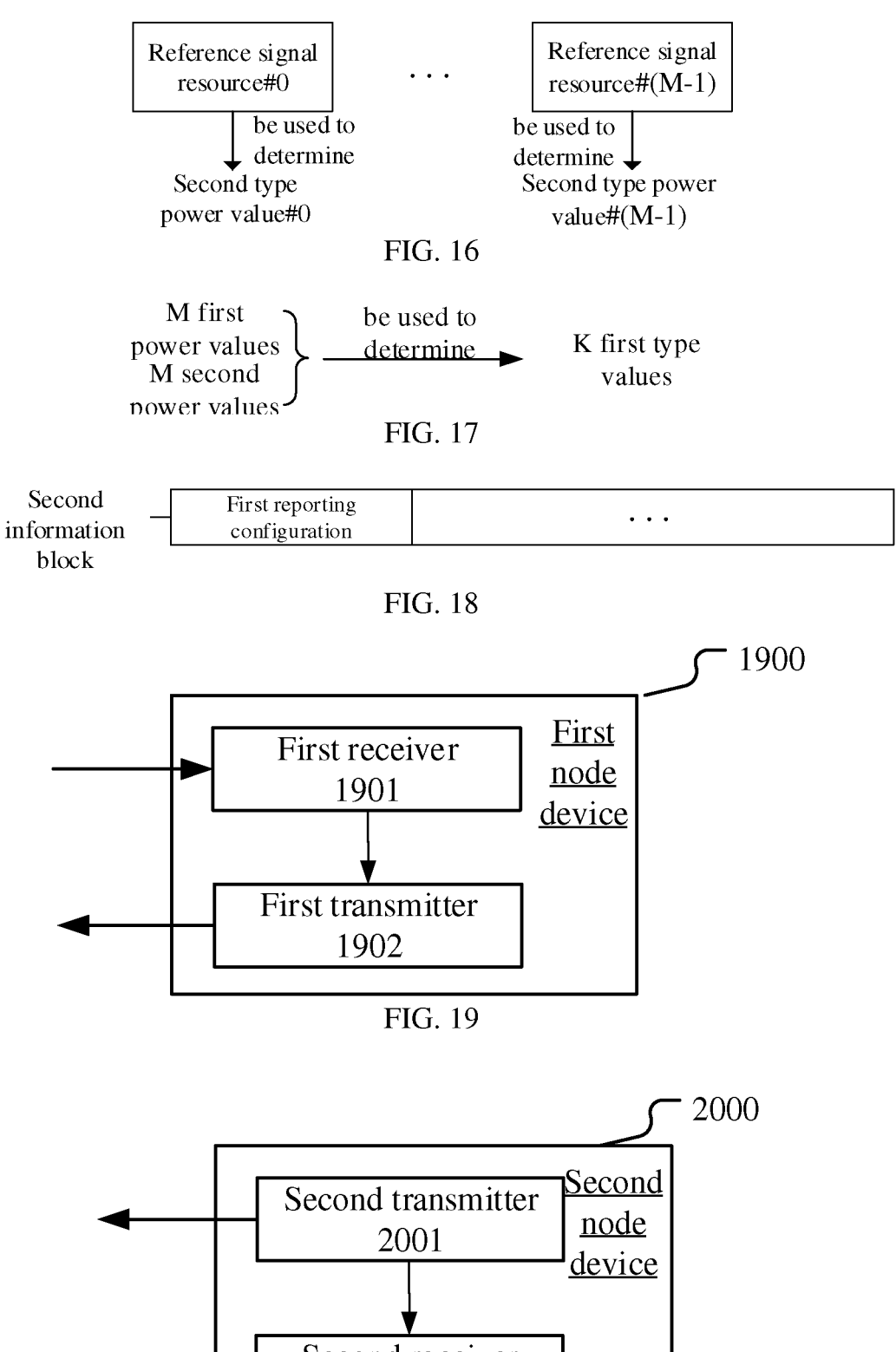

Reference signal resource#0 be used to determine

Second type power value#0

. . .

Reference signal resource#(M-1)

be used to determine

Second type power value#(M-1)

FIG. 16

M first power values
M second power values be used to determine

K first type values

FIG. 17

Second information block

First reporting configuration | . . .

First receiver 1901

First node device

First transmitter 1902

Second transmitter 2001

Second node device

Second receiver 2002

FIG. 20

NODE DEVICE USED FOR WIRELESS COMMUNICATION, AND METHOD IN NODE USED FOR WIRELESS COMMUNICATION

CROSS-REFERENCE TO RELATED APPLICATIONS

The present application is a continuation of PCT Patent Application No. PCT/CN2021/125390, filed on Oct. 21, 2021, which claims priority to Chinese Patent Application No. 202110288342.8, filed on Mar. 18, 2021. All of the aforementioned applications are incorporated herein by reference in their entireties.

TECHNICAL FIELD

The present application relates to the technical field of wireless communication, and in particular to transmission method and transmission apparatus in base station and user equipment in wireless communication system, especially a transmission method and a transmission apparatus for wireless signals in wireless communication system supporting cellular network.

BACKGROUND

Compared to the traditional third generation partner project (3GPP) long term evolution (LTE) system, the new radio (NR) system supports a more diverse range of application scenarios, such as enhanced mobile broadband (eMBB), ultra-reliable and low latency communications (URLLC), and massive machine type communications (mMTC). Compared with other application scenarios, the URLLC has higher requirements for transmission reliability and latency, with differences of several orders of magnitude in some cases, resulting in different requirements for the design of physical layer data channels and physical layer control channels in different application scenarios. In NR release (R) 15, repetitive transmission is used to improve the transmission reliability of URLLC. NR R16 introduces repetitive transmission based on multiple transmitter receiver points (TRP), further enhancing the transmission reliability of the URLLC.

SUMMARY

A method used in a first node for wireless communication is provided according to the embodiments of the present application, and the method includes:

receiving a first reference signal group within the first reference signal resource group; and
transmitting a first information block,
where the first information block is generated by measuring the first reference signal group; the first information block includes K channel quality indications, and K is a positive integer greater than 1; where the K channel quality indications correspond to K first type values, respectively, the K first type values are not equal to each other, and the K channel quality indications correspond to a same set of subbands; where the K channel quality indications correspond to K condition sets respectively; where a first channel quality indication is any channel quality indication in the K channel quality indications, and the first channel quality indication corresponds to the first condition set in the K condition sets; where the first channel quality indication that in response to the first reference resource block being occupied by a first bit block and the first condition set being met, the first bit block is received by a first node device with a transmission block error rate not exceeding the first threshold; where the first condition set includes: a receiving quality indication of the first bit block is a first value, and the first bit block is transmitted in a transmission method corresponding to the first channel quality indication; where the first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

A method used in a second node for wireless communication is further provided according to the embodiments of the present application, and the method includes:

transmitting a first reference signal group within the first reference signal resource group; and
receiving a first information block,
where the first information block is generated by measuring the first reference signal group; the first information block includes K channel quality indications, and K is a positive integer greater than 1; where the K channel quality indications correspond to K first type values, respectively, the K first type values are not equal to each other, and the K channel quality indications correspond to a same set of subbands; where the K channel quality indications correspond to K condition sets respectively; where a first channel quality indication is any channel quality indication in the K channel quality indications, and the first channel quality indication corresponds to the first condition set in the K condition sets; where the first channel quality indication indicates that in response to the first reference resource block being occupied by a first bit block and the first condition set being met, the first bit block is received by a first node device with a transmission block error rate not exceeding the first threshold; where the first condition set includes: a receiving quality indication of the first bit block is a first value, and the first bit block is transmitted in a transmission method corresponding to the first channel quality indication; where the first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

A first node device for wireless communication is further provided according to the embodiments of the present application, the first node device includes:

a first receiver to receive a first reference signal group within a first reference signal resource group; and
a first transmitter to transmit a first information block;
where the first information block is generated by measuring the first reference signal group; the first information block includes K channel quality indications, and K is a positive integer greater than 1; where the K channel quality indications correspond to K first type values, respectively, the K first type values are not equal to each other, and the K channel quality indications correspond to a same set of subbands; where the K channel quality indications correspond to K condition sets respectively; where a first channel quality indication is any channel quality indication in the K channel quality indications, and the first channel quality indication corresponds to the first condition set in the K condition sets; where the first channel quality indication indicates that in response to the first reference resource block being occupied by a first bit block and the first condition set being met, the first bit block is received by the first node device with a transmission block error rate not exceeding the first threshold; where the first condition set includes: a receiving quality indication of the first bit block is a first value, and the first bit block is transmitted in a transmission method corresponding to the first channel quality indication; where the first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

A second node device for wireless communication is further provided according to the embodiments of the present application, the second node device includes:

a second transmitter to transmit a first reference signal group within a first reference signal resource group; and a second receiver to receive a first information block;

where the first information block is generated by measuring the first reference signal group; the first information block includes K channel quality indications, and K is a positive integer greater than 1; where the K channel quality indications correspond to K first type values, respectively, the K first type values are not equal to each other, and the K channel quality indications correspond to a same set of subbands; where the K channel quality indications correspond to K condition sets respectively; where a first channel quality indication is any channel quality indication in the K channel quality indications, and the first channel quality indication corresponds to the first condition set in the K condition sets; where the first channel quality indication indicates that in response to the first reference resource block being occupied by a first bit block and the first condition set being met, the first bit block is received by a first node device with a transmission block error rate not exceeding the first threshold; where the first condition set includes: a receiving quality indication of the first bit block is a first value, and the first bit block is transmitted in a transmission method corresponding to the first channel quality indication; where the first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

BRIEF DESCRIPTION OF THE DRAWINGS

By reading and referring to the detailed description of non-limiting embodiments in the following drawings, the other features, objectives, and advantages of the present application will become more apparent:

FIG. 9 is a schematic diagram of spatial correlation between a first reference resource block and a first reference signal according to another embodiment of the present application;

FIG. 10 is a schematic diagram of spatial correlation between a given reference resource block and a given reference signal according to another embodiment of the present application;

FIG. 11 is a schematic diagram of a first reference signal and a first power value according to another embodiment of the present application;

FIG. 12 is a schematic diagram of a second reference signal resource and a second power value according to another embodiment of the present application;

FIG. 13 is a schematic diagram of the first power value, second power value, and K first type values according to another embodiment of the present application;

FIG. 14 is a schematic diagram of M reference resource sub-blocks and M reference signal spatial correlations according to another embodiment of the present application;

FIG. 15 is a schematic diagram of M reference signals and M first type power values according to another embodiment of the present application;

FIG. 16 is a schematic diagram of M reference signal resources and M second type power values according to another embodiment of the present application;

FIG. 17 is a schematic diagram of M first type power values, M second type power values, and K first type values according to another embodiment of the present application;

FIG. 18 is a schematic diagram of a second information block according to another embodiment of the present application;

FIG. 19 is a structural block diagram of a processing device for the first node device according to another embodiment of the present application; and FIG. 20 is a structural block diagram of a processing device for devices in a second node according to another embodiment of the present application.

DETAILED DESCRIPTION OF THE EMBODIMENTS

Figure 1:
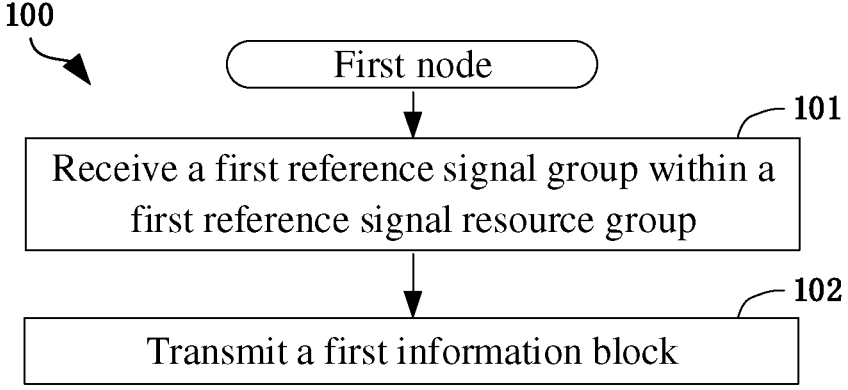
FIG. 1 is a flowchart of a first reference signal group and a first information block according to an embodiment of the present application.

In NR R17 and subsequent versions, the performance of URLLC will be further enhanced, one of the means is to improve the accuracy of MCS selection for URLLC services. In response to the above issues, the present application proposes a solution, which is a method used in the first node for wireless communication, including: receiving a first reference signal group within the first reference signal resource group, and transmitting a first information block. The first information block is generated by measuring the first reference signal group. The first information block includes K channel quality indications, and K is a positive integer greater than 1. The K channel quality indications correspond to K first type values, respectively, the K first type values are not equal to each other, and the K channel quality indications correspond to a same set of subbands. The K channel quality indications correspond to K condition sets respectively. A first channel quality indication is any channel quality indication in the K channel quality indications, and the first channel quality indication corresponds to the first condition set in the K condition sets. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first bit block is transmitted in a transmission method corresponding to the first channel quality indication. The first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block. It should be noted that although the above description uses the URLLC scenario as an example, the present application is also applicable to other scenarios such as eMBB and mMTC, and achieves similar technical effects in the URLLC scenario. In addition, different scenarios (including but not limited to URLLC, eMBB, and mMTC) adopt a unified solution also helps to reduce hardware complexity and cost. In the absence of conflict, the embodiments and features in the embodiments of the first node of the present application can be applied to the second node of the present application, and vice versa. In the absence of conflict, the embodiments and features in the embodiments in the present application can be arbitrarily combined with each other.

The following will provide further detailed explanations of the technical solution of the present application in conjunction with the accompanying drawings. It should be noted that, without conflict, the embodiments and features in the embodiments of the present application can be arbitrarily combined with each other.

First Embodiment

The first embodiment illustrates a flowchart of a first reference signal group and a first information block according to an embodiment of the present application, as shown in FIG. 1. In FIG. 1, each box represents an operation. Specifically, the order of operations in the box does not represent a specific temporal relationship between each operation.

In the first embodiment, the first node in the present application is configured to receive the first reference signal group within the first reference signal resource group in operation 101, and transmit a first information block in operation 102. Among them, the first information block is determined by measuring the first reference signal group. The first information block includes K channel quality indications, and K is a positive integer greater than 1. The K channel quality indications correspond to K first type values, respectively, the K first type values are not equal to each other, and the K channel quality indications correspond to a same set of subbands. The K channel quality indications correspond to K condition sets respectively. A first channel quality indication is any channel quality indication in the K channel quality indications, and the first channel quality indication corresponds to the first condition set in the K condition sets. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first bit block is transmitted in a transmission method corresponding to the first channel quality indication. The first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

As an embodiment, the first reference signal resource group only includes one reference signal resource, and the first reference signal group only includes one reference signal. The one reference signal resource is reserved for the one reference signal.

As an embodiment, the first reference signal resource group includes S reference signal resources, and the first reference signal group includes S reference signals, where S is a positive integer greater than 1. The S reference signal resources are respectively reserved for the S reference signals.

As an embodiment, the number of reference signal resources included in the first reference signal resource group is equal to the number of reference signals included in the first reference signal group.

As an embodiment, the first reference signal resource group includes channel state information reference signal (CSI-RS) resources.

As an embodiment, the first reference signal resource group includes a CSI-RS resource set.

As an embodiment, the first reference signal resource group includes synchronous signal/physical broadcast channel block (SSB) resources.

As an embodiment, the first reference signal resource group includes sounding reference signal (SRS) resources.

As an embodiment, the first reference signal resource group includes an SRS resource set.

As an embodiment, the first reference signal resource group includes one or more reference signal resources.

As an embodiment, any reference signal resource in the first reference signal resource group includes one of CSI-RS resources, SSB resources, or SRS resources.

As an embodiment, the first reference signal group includes CSI-RS.

As an embodiment, the first reference signal group includes an SSB.

As an embodiment, the first reference signal group includes SRS.

As an embodiment, the first reference signal group includes one or more reference signals.

As an embodiment, any reference signal in the first reference signal group includes one of CSI-RS, SSB, or SRS.

As an embodiment, there are two reference signals in the first reference signal group that cannot be assumed to be quasi co-located (QCL).

As an embodiment, there are two reference signals in the first reference signal group that cannot be assumed as QCL and correspond to QCL TypeD.

As an embodiment, there are two reference signals in the first reference signal group that are QCL.

As an embodiment, there are two reference signals in the first reference signal group that are QCL and correspond to QCL TypeD.

As an embodiment, there is a reference signal in the first reference signal group that appears multiple times in the time domain.

As an embodiment, there is a reference signal in the first reference signal group that periodically appears in the time domain.

As an embodiment, there is one reference signal in the first reference signal group that only appears once in the time domain.

As an embodiment, there is a reference signal in the first reference signal group that appears non periodically in the time domain.

As an embodiment, all reference signals in the first reference signal group are sequentially indexed in the first reference signal group.

As an embodiment, there is a reference signal in the first reference signal group that is received by the first node before the second information block.

As an embodiment, there is a reference signal in the first reference signal group that is received by the first node after the second information block.

As an embodiment, the first information block includes higher layer information.

As an embodiment, the first information block includes radio resource control (RRC) layer information.

As an embodiment, the first information block includes medium access control layer control element (MAC CE) information.

As an embodiment, the first information block includes physical layer information.

As an embodiment, the first information block includes uplink control information (UCI).

As an embodiment, the first information block includes hybrid automatic repeat request acknowledgment (HARQ-ACK).

As an embodiment, the first information block includes channel state information (CSI).

As an embodiment, the first information block includes a channel quality indicator (CQI).

As an embodiment, the first information block includes precoding matrix indicator (PMI).

As an embodiment, the first information block includes a rank indicator (RI).

As an embodiment, the first information block includes a CSI-RS resource indicator (CRI).

As an embodiment, the first information block includes synchronous signal/physical broadcast channel block resource indicator (SSBRI).

As an embodiment, each of the K channel quality indications includes K CQIs.

As an embodiment, each of the K channel quality indications is K CQIs.

As an embodiment, the K channel quality indications each include K reference signal received powers (RSRP).

As an embodiment, the K channel quality indications each include K signal to noise and interference ratios (SINR).

As an embodiment, the K channel quality indications are each K CQIs, and the first information block includes a CQI index corresponding to each of the K channel quality indications.

As an embodiment, the K is configurable.

As an embodiment, the K is configured for RRC signaling.

As an embodiment, the K is configured for MAC CE signaling.

As an embodiment, the K is dynamically configured for signaling.

As an embodiment, a first reporting configuration indicates the K.

As an embodiment, the first information block indicates the K.

As an embodiment, the K channel quality indications are sequentially arranged in the first information block.

As an embodiment, the K channel quality indications are sequentially arranged in the first information block according to the corresponding first type values in descending order.

As an embodiment, the K channel quality indications are sequentially arranged in the first information block according to the corresponding first type values in descending order.

As an embodiment, the channel quality indication corresponding to the i-th first type value among the K first type values is the i-th channel quality indication among the K channel quality indications, where i is any positive integer not greater than the K.

As an embodiment, the K first type values are sequentially arranged.

As an embodiment, the K first type values are arranged in descending order.

As an embodiment, the K first type values are arranged in descending order.

As an embodiment, the K first type values are real numbers.

As an embodiment, the K first type values are respectively non negative real numbers.

As an embodiment, the unit of K first type values is dB.

As an embodiment, the first information block does not include the K first type values.

As an embodiment, the first information block does not indicate the K first type values.

As an embodiment, the first information block does not display an indication of K first type values.

As an embodiment, the first information block implicitly indicates K first type values.

As an embodiment, the K channel quality indications are all broadband channel quality indications.

As an embodiment, the K channel quality indications are all sub band channel quality indications.

As an embodiment, the same set of sub bands includes 1 sub band.

As an embodiment, the same set of subbands includes positive integer subbands greater than 1.

As an embodiment, a subband includes a positive integer greater than 1 with consecutive physical resource blocks (PRB).

As an embodiment, the same set of subbands includes a positive integer greater than 1 with consecutive subbands.

As an embodiment, the same set of subbands includes a positive integer greater than 1 with discontinuous subbands.

As an embodiment, the number of PRBs included in any two sub bands in the same sub band set is the same.

As an embodiment, any two sub bands in the same set of sub bands are orthogonal to each other in the frequency domain.

As an embodiment, the expression "the first information block is generated by measuring the first reference signal group" means that one or more reference signals in the first reference signal group are measured to generate the first information block.

As an embodiment, the expression "the first information block is generated by measuring the first reference signal group" means that each reference signal in the first reference signal group is measured to generate the first information block.

As an embodiment, the expression "the first information block is generated by measuring the first reference signal group" means that only a part of the reference signals in the first reference signal group is measured to generate the first information block.

As an embodiment, one or more reference signals in the first reference signal group are measured to determine a SINR, which is used to determine one or more CQIs through table lookup. The first information block carries the one or more CQIs.

As an embodiment, one or more reference signals in the first reference signal group are measured to determine a CSI, and the first information block carries the same CSI.

As an embodiment, one or more reference signals in the first reference signal group are measured to determine a first channel matrix, which is used to determine a CSI. The first information block carries one CSI.

As an embodiment, the RSRP of one or more reference signals in the first reference signal group is used to determine the first information block.

As an embodiment, one or more reference signals in the first reference signal group is channel-measured to determine the first information block.

As an embodiment, one or more reference signals in the first reference signal group is interference-measured to determine the first information block.

As an embodiment, the first node is configured to only obtain channel measurements for calculating the CSI included in the first information block based on the first reference signal group before the first reference resource block.

As an embodiment, the first node only obtains channel measurements for calculating the CSI included in the first information block based on the first reference signal group closest to the first reference resource block.

As an embodiment, the first node is configured to only obtain interference measurements for calculating the CSI included in the first information block based on the first reference signal group before the first reference resource block.

As an embodiment, the first node is configured to only obtain interference measurements for calculating the CSI included in the first information block based on the first reference signal group closest to the first reference resource block.

As an embodiment, the first reference signal group is used for channel measurement.

As an embodiment, the first reference signal group is used for channel measurement of one report in the first reporting configuration.

As an embodiment, the first reference signal group is used for interference measurement.

As an embodiment, the first reference signal group is used for interference measurement of one report in the first reporting configuration.

As an embodiment, the first bit block includes a transport block (TB).

As an embodiment, the first bit block is a terabyte.

As an embodiment, the first bit block includes a code block (CB).

As an embodiment, the first bit block includes a code block group (CBG).

As an embodiment, the first bit block includes a TB of bits after channel encoding and rate matching.

As an embodiment, the first bit block includes a CB bit after channel encoding and rate matching.

As an embodiment, the first bit block includes a CBG bit after channel encoding and rate matching.

As an embodiment, the first bit block is transmitted on a physical downlink shared channel (PDSCH).

As an embodiment, the first bit block includes positive integer bits greater than 1.

As an embodiment, all bits in the first bit block are sequentially arranged in the first bit block.

As an embodiment, the first bit block includes cyclic redundancy check (CRC) bits.

As an embodiment, the first bit block does not occupy a multi carrier symbol carrying demodulation reference signals (DMRS) in the first reference resource block.

As an embodiment, the transmission block error rate refers to the Transport Block Error Probability.

As an embodiment, the first threshold is a positive real number less than 1.

As an embodiment, the first threshold is 0.1.

As an embodiment, the first threshold is 0.00001.

As an embodiment, the first threshold is 0.000001.

As an embodiment, the first threshold is a positive real number that is not greater than 0.1 and not less than 0.000001.

As an embodiment, the first threshold is common to the quality of the K channels.

As an embodiment, the probability of the first bit block being erroneously received by the first node does not exceed the first threshold.

As an embodiment, the first node determines based on the CRC that the probability of the first bit block not being correctly received does not exceed the first threshold.

As an embodiment, the receiving quality indication of the first bit block includes SINR.

As an embodiment, the receiving quality indication of the first bit block is SINR.

As an embodiment, the receiving quality indication of the first bit block includes RSRP.

As an embodiment, the receiving quality indication of the first bit block includes signal power.

As an embodiment, the receiving quality indication of the first bit block includes interference power.

As an embodiment, the receiving quality indication of the first bit block includes noise power.

As an embodiment, the receiving quality indication of the first bit block refers to the receiving quality indication of the wireless signal carrying the first bit block.

As an embodiment, the received quality indication of the first bit block is equal to the linear mean of the power contribution of the resource element (RE) carrying the first bit block divided by the linear mean of the interference and noise power contributions of the RE carrying the first bit block.

As an embodiment, the received quality indication of the first bit block is equal to the dB value of the first reference value, which is the linear average of the power contribution of the RE carrying the first bit block divided by the linear average of the interference and noise power contributions of the RE carrying the first bit block.

As an embodiment, the receiving quality indication of the first bit block is the RSRP carrying the RE of the first bit block.

As an embodiment, the receiving quality indication of the first bit block is a linear average of the power contribution of the RE carrying the first bit block.

As an embodiment, the receiving quality indication of the first bit block is the dB value of the linear average power contribution of the RE carrying the first bit block.

As an embodiment, the receiving quality indication of the first bit block is the linear average of the interference and noise power contributions of the RE carrying the first bit block.

As an embodiment, the receiving quality indication of the first bit block is the dB value of the linear average of the interference and noise power contributions of the RE carrying the first bit block.

As an embodiment, the receiving quality indication of the first bit block is a real number.

As an embodiment, the receiving quality indication of the first bit block is a non negative real number.

As an embodiment, the unit of the receiving quality indication of the first bit block is dB.

As an embodiment, the transmission method corresponding to any of the K channel quality indications includes modulation scheme, code rate, and transmission block size.

As an embodiment, the transmission method corresponding to any of the K channel quality indications includes a modulation method.

As an embodiment, the transmission method corresponding to any of the K channel quality indications includes a bit rate.

As an embodiment, the transmission method corresponding to any of the K channel quality indications includes a transmission block size.

As an embodiment, the transmission method corresponding to any of the K channel quality indications can be applied to the PDSCH transmitted in the first reference resource block.

As an embodiment, the K channel quality indications respectively indicate K modulation methods.

As an embodiment, the K channel quality indications indicate K bit rates respectively.

As an embodiment, the modulation method corresponding to any given channel quality indication among the K channel quality indications is the modulation method indicated by the given signaling quality indication.

As an embodiment, the transmission block size corresponding to any of the K channel quality indications is obtained according to the method in 5.1.3.2 of 3GPP technical specification (TS) 38.214.

As an embodiment, the bit rate corresponding to any given channel quality indication among the K channel quality indications is the bit rate indicated by the given signaling quality indication.

As an embodiment, the bit rate corresponding to any given channel quality indication among the K channel quality indications is the actual bit rate caused by the modulation method corresponding to a pair of the given channel quality indication and transmission block size being applied to the first reference resource block.

As an embodiment, in response to a pair of the modulation method and transmission block size corresponding to any given channel quality indication among the K channel quality indications being applied to the first reference resource block, the actual bit rate is an available bit rate closest to the bit rate indicated by the given channel quality indication.

As an embodiment, for any given channel quality indication among the K channel quality indications, in response to an actual bit rate caused by more than one pair of the modulation method and transmission block size corresponding to the given channel quality indication being applied to the first reference resource block having same similarity as the bit rate indicated by the given channel quality indication, only the smallest pair of the modulation method and transmission block size in more than one pair of the modulation method and transmission block size corresponding to the given channel quality indication is used to determine the actual bit rate in the first reference resource block.

As an embodiment, the first condition set includes: a modulation method corresponding to the first channel quality indication is adopted by the first bit block.

As an embodiment, the first condition set includes: a bit rate corresponding to the first channel quality indication is used by the first bit block.

As an embodiment, the first condition set includes: a transmission block size corresponding to the first channel quality indication is adopted by the first bit block.

As an embodiment, the first condition set includes: a modulation method, a bit rate, and a transmission block size corresponding to the first channel quality indication are adopted by the first bit block.

As an embodiment, for any given channel quality indication corresponding to the K channel quality indications, the set of conditions corresponding to the given channel quality indication includes: a modulation method, a bit rate, and transmission block size corresponding to the given channel quality indication are adopted by the first bit block.

As an embodiment, the first information block includes a first rank number, and any of the K channel quality indications is obtained under the condition of the first rank number.

As an embodiment, the first information block includes a first rank number, and any of the K condition sets includes: the number of layers in the first bit block is equal to the first rank number.

As an embodiment, the first information block indicates a first PMI, and any of the K channel quality indications is obtained under the conditions of the first PMI.

As an embodiment, the first information block indicates a first PMI, and any of the K condition sets includes: the first PMI is applied to the precoding of the first bit block in the first reference resource block.

As an embodiment, the first channel quality indication is a CQI, and the first channel quality indication is the CQI with the highest corresponding CQI index in the first CQI set. For any given CQI in the first CQI set, in response to the first bit block occupying the first reference resource block and the given condition set being met, the first bit block can be received by the first node with a transmission block error rate not exceeding the first threshold. The given condition set includes: the receiving quality indication of the first bit block is the first value, and a transmission method corresponding to the given CQI is adopted by the first bit block.

The transmission method corresponding to the given CQI includes one or more of a modulation method, a bit rate, or a transmission block size.

As a sub embodiment of the above embodiment, the given condition set includes: the first bit block is transmitted in a modulation method corresponding to the given CQI, a bit rate, and a transmission block size.

As a sub embodiment of the above embodiment, the first information block includes a first rank number, and the given CQI is obtained under the conditions of the first rank number.

As a sub embodiment of the above embodiment, the first information block indicates that a first PMI, and the given CQI is obtained under the conditions of the first PMI.

As a sub embodiment of the above embodiment, the first information block indicates that a first CRI, and the given CQI is obtained under the conditions of the first CRI.

As a sub embodiment of the above embodiment, the given CQI is obtained under the conditions of the first reference signal.

As a sub embodiment of the above embodiment, the first information block indicates that a first CRI set, and the given CQI is obtained under the conditions of the first CRI set.

As a sub embodiment of the above embodiment, the given CQI is obtained under the conditions of the M reference signals.

As a sub embodiment of the above embodiment, the given CQI is for the same set of sub bands.

Second Embodiment

Figure 2:
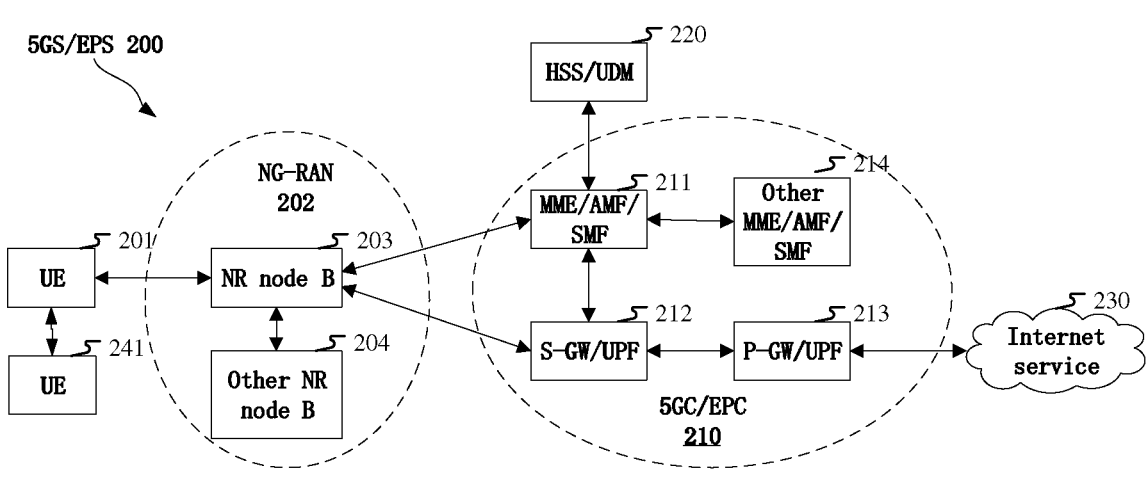
FIG. 2 is a schematic diagram of a network architecture according to another embodiment of the present application.

The second embodiment illustrates a schematic diagram of a network architecture according to an embodiment of the present application, as shown in FIG. 2.

FIG. 2 illustrates a network architecture 200 of long term evolution (LTE), long term evolution advanced (LTE-A), and future 5G systems. The network architecture 200 of LTE-A and future 5G systems is referred to as evolved packet system (EPS). The network architecture 200 of 5G NR or LTE is referred to as 5G System (5GS)/evolved packet system (EPS) 200 or some other suitable term. 5GS/EPS 200 includes one or more user equipment (UE) 201, a UE 241 in communication with the UE 201 on a side link, next generation radio access network (NG-RAN) 202, 5G core network (5GC)/evolved packet core (EPC) 210, home subscriber server (HS S)/unified data management (UDM) 220 and internet service 230. 5GS/EPS200 can be interconnected with other access networks, but these entities/interfaces are not shown for simplicity. As shown in FIG. 2, 5GS/EPS200 is configured to provide packet switching services, but those skilled in the art will easily understand that the various concepts presented throughout the present application can be extended to networks that provide circuit switching services. NG-RAN 202 includes NR node B (gNB) 203 and other gNB 204. The gNB 203 is configured to provide user and control plane protocol termination towards UE 201. The gNB 203 can be connected to other gNB204 through Xn interfaces (e.g., backhaul). The gNB203 can also be referred to as base station, base transceiver, radio base station, transceiver, transceiver function, basic service set (BSS), extended service set (ESS). The gNB203 is configured to provide UE 201 with an access point to 5GC/EPC 210. The UE 201 may be embodied as cellular phones, smartphones, session initiation protocol (SIP) phones, laptops, personal digital assistants (PDAs), satellite radios, global positioning systems, multimedia devices, video devices, and digital audio players (e.g., MP3 players), cameras, game consoles, drones, aircraft, narrowband physical network devices, machine type communication devices, land vehicles, cars, wearable devices, or any other similar functional devices. Those of skills in the art may also refer to UE 201 as a mobile station, subscriber station, mobile unit, subscriber unit, wireless unit, remote unit, mobile device, wireless device, wireless communication device, remote device, mobile subscriber station, access terminal, mobile terminal, wireless terminal, remote terminal, handheld device, user agent, mobile client, client, or some other suitable term. The gNB203 connects to 5GC/EPC 210 through S1/NG interface. 5GC/EPC 210 includes mobility management entity (MME)/authentication management field (AMF)/session management function (SMF) 211, other MME/AMF/SMF 214, service gateway (S-GW)/user plane function (UPF) 212, and packet date network gateway (P-GW)/UPF 213. MME/AMF/SMF 211 is the control node that handles signaling between UE 201 and 5GC/EPC 210. Generally, MME/AMF/SMF 211 provides bearer and connection management. All user internet protocols (IP) packets are transmitted through S-GW/UPF 212, which connects itself to P-GW/UPF 213. The P-GW 213 is configured to provide UE IP address allocation and other functions. The P-GW/UPF 213 connects to Internet service 230. Internet service 230 includes operator specific Internet protocol services, which can include Internet, Intranet, IP multimedia subsystem (IMS), and packet switching services.

As an embodiment, the first node in the present application includes the UE 201.

As an embodiment, the first node in the present application includes the UE 241.

As an embodiment, the second node in the present application includes the gNB 203.

As an embodiment, the second node in the present application includes UE 241.

As an embodiment, the wireless link between UE 201 and gNB 203 is a cellular network link.

As an embodiment, the wireless link between UE 201 and UE 241 is a side link.

As an embodiment, the sender of the first reference signal group in the present application includes the gNB 203.

As an embodiment, the receiver of the first reference signal group in the present application includes the UE 201.

As an embodiment, the sender of the first information block in the present application includes UE 201.

As an embodiment, the recipient of the first information block in the present application includes gNB 203.

Third Embodiment

Figure 3:
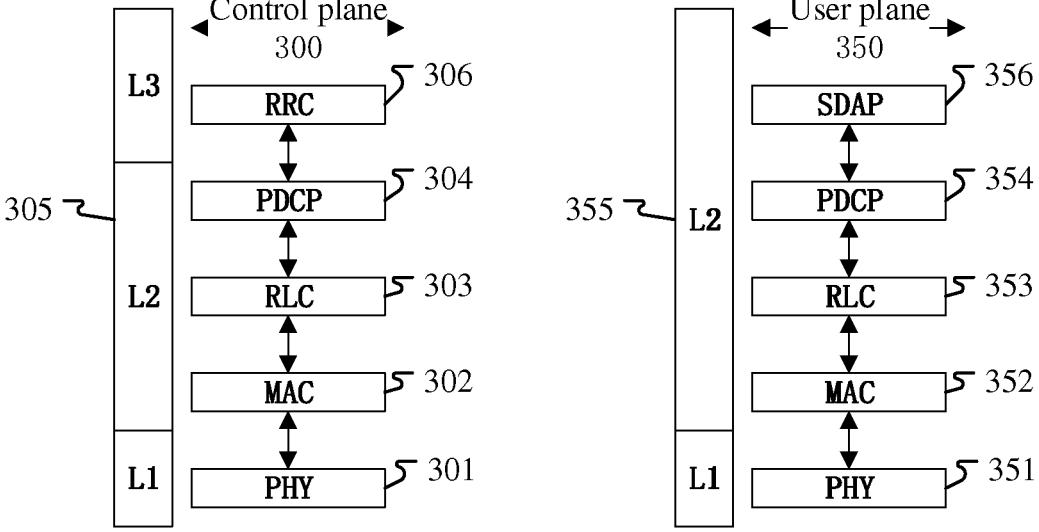
FIG. 3 is a schematic diagram of a wireless protocol architecture for a user plane and a control plane according to another embodiment of the present application.

The third embodiment illustrates a schematic diagram of the wireless protocol architecture of the user plane and control plane according to an embodiment of the present application, as shown in FIG. 3.

The third embodiment illustrates a schematic diagram of an embodiment of a wireless protocol architecture for a user plane and a control plane according to the present application, as shown in FIG. 3. FIG. 3 is a schematic diagram illustrating an embodiment of a wireless protocol architecture for a user plane 350 and a control plane 300. FIG. 3 displays a radio protocol architecture between a road side unit (RSU) in a first communication node device (UE, gNB, or vehicle to everything (V2X)) and a RSU in a second communication node device (gNB, UE or RSU in V2X) or a radio protocol architecture between control planes 300 of two UEs: layer 1, layer 2, and layer 3. Layer 1 (L1) is the lowest layer and implements various physical layer (PHY) signal processing functions. Layer L1 will be referred to as PHY 301 hereinafter. Layer 2 (L2) 305 is located above PHY301 and is responsible for the link between the first communication node device and the second communication node device, or between two UEs. L2 layer 305 includes medium access control (MAC) sublayer 302, radio link control protocol (RLC) sublayer 303, and packet data convergence protocol (PDCP) sub layer 304, which terminates at the second communication node device. The PDCP sub layer 304 is configured to provide multiplexing between different radio bearers and logical channels. The PDCP sub layer 304 is also configured to provide security by encrypting data packets, as well as support for cross zone movement of the first communication node device between second communication node devices. The RLC sub layer 303 is configured to provide segmentation and reassembly of upper layer data packets, re-transmission of lost data packets, and reorder of data packets to compensate for disordered receiving caused by HARQ. The MAC sublayer 302 is configured to provide multiplexing between logical and transmission channels. The MAC sublayer 302 is also configured to allocate various radio resources (e.g., resource blocks) in a cell between first communication node devices. MAC sublayer 302 is also responsible for HARQ operations. The RRC sublayer 306 in layer 3 (L3 layer) of control plane 300 is configured to obtain radio resources (i.e., radio bearer) and configure the lower layer using RRC signaling between the second communication node device and the first communication node device. The radio protocol architecture of user plane 350 includes L1 and L2. The radio protocol architecture used for the first communication node device and the second communication node device in user plane 350 is generally the same as the corresponding layers and sublayers in control plane 300 for physical layer 351, PDCP sublayer 354 in L2 layer 355, RLC sublayer 353 in L2 layer 355, and MAC sublayer 352 in L2 layer 355, but PDCP sublayer 354 is also configured to provide header compression for upper layer packets to reduce radio transmission overhead. L2 in user plane 350 Layer 355 also includes service data adaptation protocol (SDAP) sublayer 356, which is configured to map between QoS flow and data radio bearer (DRB) to support diversity of services. Although not shown, the first communication node device may have several upper layers above L2 layer 355, including a network layer (e.g., IP layer) terminating at P-GW on the network side and the application layer terminated at the other end of the connection (e.g., remote UE, server, etc.).

As an embodiment, the wireless protocol architecture in FIG. 3 is applicable to the first node in the present application.

As an embodiment, the wireless protocol architecture in FIG. 3 is applicable to the second node in the present application.

As an embodiment, the first reference signal group is generated on the PHY 301 or PHY 351.

As an embodiment, the first information block is generated on the PHY 301 or PHY 351.

As an embodiment, the second information block is generated at the RRC sublayer 306.

Fourth Embodiment

Figure 4:
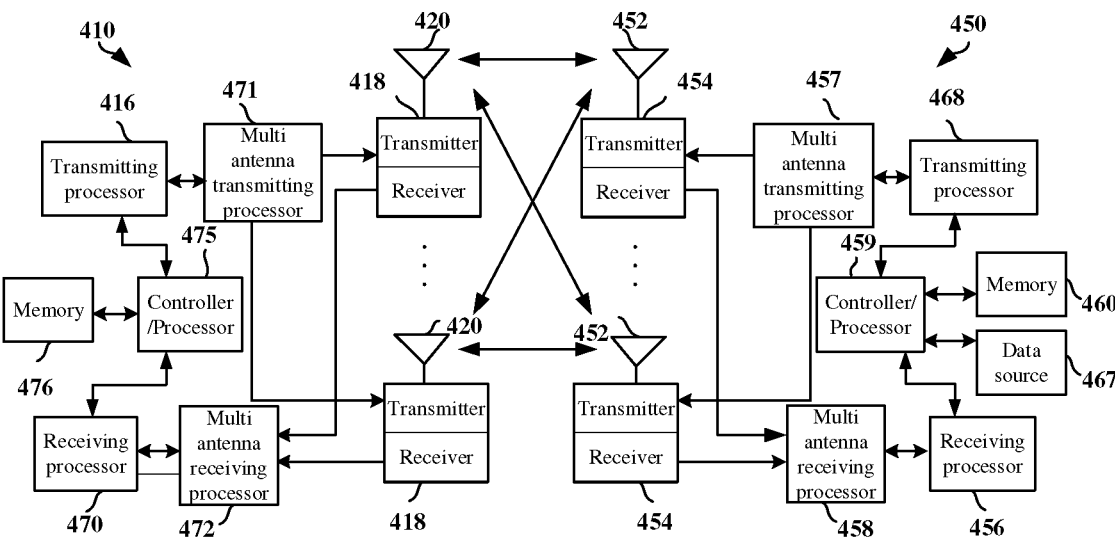
FIG. 4 is a schematic diagram of a first communication device and the second communication device according to another embodiment of the present application.

The fourth embodiment illustrates a schematic diagram of the first communication device and the second communication device according to an embodiment of the present application, as shown in FIG. 4. FIG. 4 is a block diagram of the first communication device 410 and the second communication device 450 that communicate with each other in an access network.

The first communication device 410 includes a controller/processor 475, a memory 476, a receiving processor 470, a transmitting processor 416, a multi antenna receiving processor 472, a multi antenna transmitting processor 471, a transmitter/receiver 418, and an antenna 420.

The second communication device 450 includes a controller/processor 459, a memory 460, a data source 467, a transmitting processor 468, a receiving processor 456, a multi antenna transmitting processor 457, a multi antenna receiving processor 458, a transmitter/receiver 454, and an antenna 452.

In the transmission from the first communication device 410 to the second communication device 450, upper layer data packets from the core network are provided to the controller/processor 475 at the first communication device 410. The controller/processor 475 implements the functionality of the L2 layer. In DL, the controller/processor 475 provides header compression, encryption, packet segmentation and reordering, multiplexing between logic and transmission channels, and multiplexing based on various priorities The radio resource allocation of the second communication device 450 is measured by level. The controller/processor 475 is also responsible for HARQ operation, retransmission of lost packets, and signaling to the second communication device 450. The transmitting processor 416 and multi-antenna transmitting processor 471 implement various signal processing functions for the L1 layer (i.e., the physical layer). The transmitting processor 416 is configured to implement encoding and interleaving to promote forward error correction (FEC) at the second communication device 450, as well as the constellation mapping of modulation schemes based on various modulation schemes, such as binary phase shift keying (BPSK), quadrature phase shift keying (QPSK), multiple phase shift keying (M-PSK), and multiple quadrature amplitude modulation (M-QAM). The multi-antenna transmitting processor 471 is configured to perform digital spatial precoding on the encoded and modulated symbols, which includes codebook-based precoding and non-codebook-based precoding, and beamforming processing to generate one or more parallel streams. The transmitting processor 416 then maps each parallel stream to a subcarrier and compares the modulated symbols with the reference signal (such as pilot) in the time and/or frequency domains multiplexing, followed by the use of inverse fast Fourier transform (IFFT) to generate a physical channel carrying a time-domain multicarrier symbol stream. Subsequently, the multi-antenna transmitting processor 471 is configured to perform transmission simulation precoding/beamforming operations on the time-domain multicarrier symbol stream. Each transmitter 418 is configured to convert the baseband multicarrier symbol stream provided by the multi-antenna transmitting processor 471 into an RF stream, which is then provided to different antennas 420.

In the transmission from the first communication device 410 to the second communication device 450, each receiver 454 is configured to receive a signal through its corresponding antenna 452 at the second communication device 450. Each receiver 454 is configured to restore the information modulated onto the RF carrier and converts the RF stream into a baseband multi carrier symbol stream, which is provided to the receiving processor 456. The receiving processor 456 and the multi antenna receiving processor 458 are configured to implement various signal processing functions of the L1 layer. The multi-antenna receiving processor 458 is configured to perform receiving simulation precoding/beamforming operations on the baseband multi-carrier symbol stream from receiver 454. The receiving processor 456 is configured to convert the baseband multi-carrier symbol stream after receiving simulated precoding/beamforming operations from the time domain to the frequency domain by fast Fourier transform (FFT). In the frequency domain, the physical layer data signal and reference signal are demultiplexed by the receiving processor 456, where the reference signal is used for channel estimation. The data signal is detected by multiple antennas in the multi-antenna receiving processor 458 and restored to any parallel stream destined for the second communication device 450. The symbols on each parallel stream are demodulated and restored by the receiving processor 456, to generate soft decisions. The receiving processor 456 then decodes and de-interleaves the soft decisions to recover the upper layer data and control signals transmitted by the first communication device 410 on the physical channel. The upper layer data and control signals are then provided to the controller/processor 459. The controller/processor 459 is configured to implements the functions of the L2 layer. The controller/processor 459 can be connected to the memory 460 storing program code and data Association. Memory 460 may be referred to as computer readable media. In downlink (DL), the controller/processor 459 is configured to provide multiplexing between transmission and logical channels, packet reassembly, decryption, header decompression, and control signal processing to recover upper layer data packets from the core network. The upper layer data packets are then provided to all protocol layers above L2 layer. Various control signals can also be provided to L3 for L3 processing. The Controller/processor 459 is also configured to perform error detection using acknowledgment (ACK) and/or not acknowledgment (NACK) protocols to support HARQ operations.

In the transmission from the second communication device 450 to the first communication device 410, a data source 467 is used at the second communication device 450 to provide upper layer data packets to the controller/processor 459. The data source 467 represents all protocol layers above the L2 layer. Similar to the transmission function at the first communication device 410 described in DL, the controller/processor 459 implements header compression based on the wireless resource allocation of the first communication device 410 Reduction, encryption, packet segmentation and reordering, as well as multiplexing between logic and transmission channels, implement L2 layer functions for user plane and control plane. The controller/processor 459 is also responsible for HARQ operation, retransmission of lost packets, and signaling to the first communication device 410. The transmitting processor 468 is configured to perform modulation mapping, channel encoding processing, and the multi-antenna transmitting processor 457 is configured to perform digital multi-antenna spatial precoding, including precoding based on the codebook and non-codebook-based precoding, as well as beamforming processing, are then modulated into a multi carrier/single carrier symbol stream by the transmitting processor 468. After simulated precoding/beamforming operations in the multi antenna transmitting processor 457, each transmitter 454 first converts the baseband symbol stream provided by the multi antenna transmitting processor 457 into a radio frequency symbol stream, and then provides to antenna 452.

In the transmission from the second communication device 450 to the first communication device 410, the function at the first communication device 410 is similar to the receiving function at the second communication device 450 described in the transmission from the first communication device 410 to the second communication device 450. Each receiver 418 is configured to receive RF signals through its corresponding antenna 420, converts the received RF signals into baseband signals, and provides baseband signals to multi-antenna receiving processor 472 and receiving processor 470. The receiving processor 470 and multi-antenna receiving processor 472 jointly implement the functions of the L1 layer. The controller/processor 475 implements the L2 layer functions. The controller/processor 475 can be associated with a memory 476 that stores program code and data. The memory 476 can be referred to as a computer-readable medium. The controller/processor 475 provides multiplexing, packet reassembly, and decoding between transmission and logical channels Encryption, header decompression, and control signal processing to recover upper layer data packets from the second communication device 450. Upper layer data packets from the controller/processor 475 can be provided to the core network. The controller/processor 475 is also responsible for error detection using ACK and/or NACK protocols to support HARQ operations.

As an embodiment, the second communication device 450 includes: at least one processor and at least one memory, where the at least one memory includes computer program code. The at least one memory and computer program code are configured to be used with the at least one processor. The second communication device 450 is configured to at least receive the first reference signal group within the first reference signal resource group, send the first information block. The first information block is generated by measuring the first reference signal group. The first information block includes K channel quality indications, and K is a positive integer greater than 1. The K channel quality indications correspond to K first type values, respectively, the K first type values are not equal to each other, and the K channel quality indications correspond to a same set of subbands. The K channel quality indications correspond to K condition sets respectively. A first channel quality indication is any channel quality indication in the K channel quality indications, and the first channel quality indication corresponds to the first condition set in the K condition sets. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first bit block is transmitted in a transmission method corresponding to the first channel quality indication. The first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

As an embodiment, the second communication device 450 includes a memory for storing a computer readable instruction program, which generates an action when executed by at least one processor. The action includes: receiving the first reference signal group within the first reference signal resource group; transmitting the first information block. The first information block is generated by measuring the first reference signal group. The first information block includes K channel quality indications, and K is a positive integer greater than 1. The K channel quality indications correspond to K first type values, respectively, the K first type values are not equal to each other, and the K channel quality indications correspond to a same set of subbands. The K channel quality indications correspond to K condition sets respectively. A first channel quality indication is any channel quality indication in the K channel quality indications, and the first channel quality indication corresponds to the first condition set in the K condition sets. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first bit block is transmitted in a transmission method corresponding to the first channel quality indication. The first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

As an embodiment, the first communication device 410 includes: at least one processor and at least one memory, where the at least one memory includes computer program code; the at least one memory and computer program code are configured to be used with the at least one processor. The first communication device 410 device is configured to at least send the first reference signal group within the first reference signal resource group, receive the first information block. The first information block is generated by measuring the first reference signal group. The first information block includes K channel quality indications, and K is a positive integer greater than 1. The K channel quality indications correspond to K first type values, respectively, the K first type values are not equal to each other, and the K channel quality indications correspond to a same set of subbands. The K channel quality indications correspond to K condition sets respectively. A first channel quality indication is any channel quality indication in the K channel quality indications, and the first channel quality indication corresponds to the first condition set in the K condition sets. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first bit block is transmitted in a transmission method corresponding to the first channel quality indication. The first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

As an embodiment, the first communication device 410 includes a memory for storing a computer readable instruction program, which generates an action when executed by at least one processor. The action includes: sending the first reference signal group within the first reference signal resource group; receiving the first information block. The first information block is generated by measuring the first reference signal group. The first information block includes K channel quality indications, and K is a positive integer greater than 1. The K channel quality indications correspond to K first type values, respectively, the K first type values are not equal to each other, and the K channel quality indications correspond to a same set of subbands. The K channel quality indications correspond to K condition sets respectively. A first channel quality indication is any channel quality indication in the K channel quality indications, and the first channel quality indication corresponds to the first condition set in the K condition sets. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first bit block is transmitted in a transmission method corresponding to the first channel quality indication. The first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

As an embodiment, the first node in the present application includes the second communication device 450.

As an embodiment, the second node in the present application includes the first communication device 410.

As an embodiment, at least one of an antenna 452, a receiver 454, a receiving processor 456, a multi antenna receiving processor 458, a controller/processor 459, a memory 460, and a data source 467 is used to receive the first reference signal group within the first reference signal resource group. At least one of an antenna 420, a transmitter 418, a transmitting processor 416, multi antenna transmitting processor 471, a controller/processor 475, and a memory 476 is used to transmit the first reference signal group within the first reference signal resource group.

As an embodiment, at least one of the antennas 420, the receiver 418, the receiving processor 470, the multi antenna receiving processor 472, the controller/processor 475, and the memory 476 is used to receive the first information block. At least one of the antenna 452, transmitter 454, the transmitting processor 468, the multi antenna transmitting processor 457, the controller/processor 459, the memory 460, and the data source 467 is used to transmit the first information block.

As an embodiment, at least one of the antenna 452, the receiver 454, the receiving processor 456, the multi antenna receiving processor 458, the controller/processor 459, the memory 460, and the data source 467 is used to receive the second information block. At least one of the antenna 420, the transmitter 418, the transmitting processor 416, the multi antenna transmitting processor 471, the controller/processor 475, and the memory 476 is used to transmit the second information block.

Fifth Embodiment

Figures 5, 6, 7, 8:
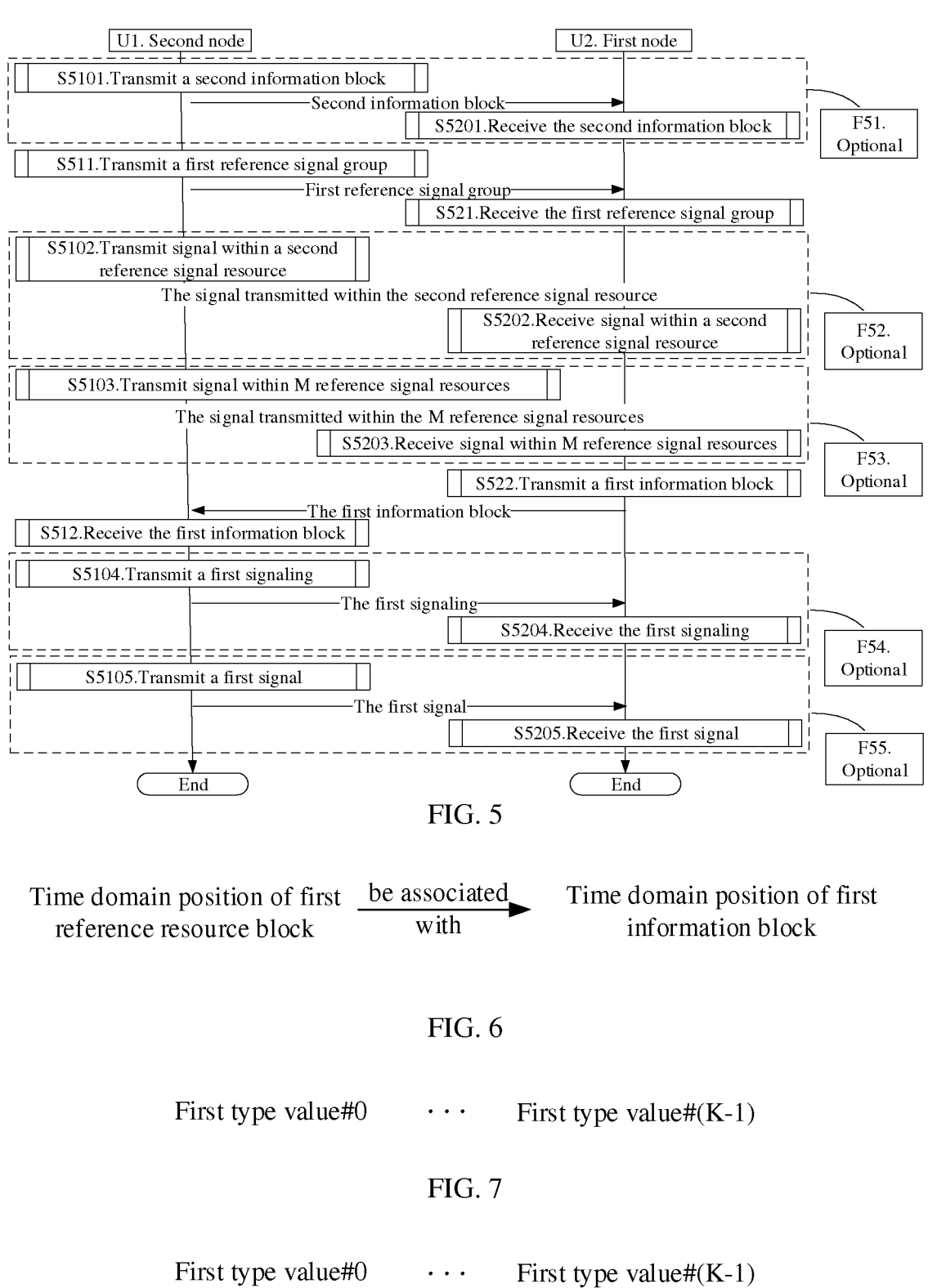
FIG. 5 is a flowchart of transmission according to another embodiment of the present application.
FIG. 6 is a schematic diagram of a time domain position of a first reference resource block associated with a time domain resource occupied by a first information block according to another embodiment of the present application.
FIG. 7 is a schematic diagram of K first type values being an equal ratio sequence according to another embodiment of the present application.
FIG. 8 is a schematic diagram of K first type values being an equal difference sequence according to another embodiment of the present application.

The fifth embodiment illustrates a flowchart of wireless transmission according to an embodiment of the present application, as shown in FIG. 5. In FIG. 5, the second node U1 and the first node U2 are communication nodes transmitted through an air interface. In FIG. 5, the operations in boxes F51 to F55 are optional, respectively.

For the second node U1, the second information block is transmitted in operation S5101. The first reference signal group is transmitted in operation S511. The signal is transmitted in the second reference signal resource in operation S5102. The signal is transmitted in M reference signal resources in operation S5103. The first information block is received in operation S512. The first signaling is transmitted in operation S5104. The first signal is transmitted in operation S5105.

For the first node U2, the second information block is received in operation S5201. The first reference signal group is received in operation S521. The signal is received in the second reference signal resource in operation S5202. The signal is received in M reference signal resources in operation S5203. The first information block is transmitted in operation S522. The first signaling is received in operation S5204. The first signal is received in operation S5205.

In the fifth embodiment, the first information block is generated by measuring the first reference signal group. The first information block includes K channel quality indications, and K is a positive integer greater than 1. The K channel quality indications correspond to K first type values, respectively, the K first type values are not equal to each other, and the K channel quality indications correspond to a same set of subbands. The K channel quality indications correspond to K condition sets respectively. A first channel quality indication is any channel quality indication in the K channel quality indications, and the first channel quality indication corresponds to the first condition set in the K condition sets. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first bit block is transmitted in a transmission method corresponding to the first channel quality indication. The first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

As an embodiment, the first node U2 is the first node in the present application.

As an embodiment, the second node U1 is the second node in the present application.

As an embodiment, the air interface between the second node U1 and the first node U2 includes a wireless interface between the base station equipment and the user equipment.

As an embodiment, the air interface between the second node U1 and the first node U2 includes a wireless interface between user equipment and user equipment.

As an embodiment, the second node U1 is a service cell maintenance base station of the first node U2.

As an embodiment, the first information block is transmitted on an uplink physical layer control channel (i.e., an uplink channel that can only be used to carry physical layer signaling).

As an embodiment, the first information block is transmitted on physical uplink control channel (PUCCH).

As an embodiment, the first information block is transmitted on an uplink physical layer data channel (i.e., an uplink channel that can be used to carry physical layer data).

As an embodiment, the first information block is transmitted on physical uplink shared channel (PUSCH).

As an embodiment, the first information block is transmitted on physical sidelink shared channel (PSSCH).

As an embodiment, the operations in box F51 in FIG. 5 exist. The second information block indicates the first reporting configuration, the first reporting configuration indicates a set of first reporting quantities and a set of first reference signals, and the first reporting quantity set is used to determine the content of the first information block.

As an embodiment, the second information block is transmitted on PDSCH.

As an embodiment, the operations in box F51 in FIG. 5 do not exist.

As an embodiment, the operations in box F52 in FIG. 5 exist.

As an embodiment, the first node is configured to receive a reference signal in the second reference signal resource.

As an embodiment, the first node is configured to receive a wireless signal in the second reference signal resource.

As an embodiment, there is a reference signal in the first reference signal group that is earlier than the second reference signal resource.

As an embodiment, there is a reference signal in the first reference signal group that is later than the second reference signal resource.

As an embodiment, the operations in box F52 in FIG. 5 do not exist.

As an embodiment, the operations in box F53 in FIG. 5 exist.

As an embodiment, the first node is configured to receive a reference signal in the M reference signal resources.

As an embodiment, the first node is configured to receive wireless signals in the M reference signal resources.

As an embodiment, there is a reference signal in the first reference signal group that is earlier than one of the M reference signal resources.

As an embodiment, there is a reference signal in the first reference signal group that is later than one of the M reference signal resources.

As an embodiment, the operations in box F53 in FIG. 5 do not exist.

As an embodiment, the operations in boxes F54 and F55 in FIG. 5 both exist. The first signaling includes scheduling information of the first signal, and the K channel quality indications are used to determine the MCS of the first signal.

As an embodiment, the K channel quality indications are used by the second node to determine the MCS of the first signal.

As an embodiment, the first signaling includes dynamic signaling.

As an embodiment, the first signaling includes signaling for layer 1 (L1).

As an embodiment, the first signaling includes control signaling for layer 1 (L1).

As an embodiment, the first signaling includes downlink control information (DCI).

As an embodiment, the first signaling includes one or more fields within a DCI.

As an embodiment, the first signaling includes DCI for downlink Grant.

As an embodiment, the first signaling includes DCI for semi static scheduling (SPS) activation.

As an embodiment, the first signaling includes RRC signaling.

As an embodiment, the first signaling includes MAC CE signaling.

As an embodiment, the first signal includes a baseband signal.

As an embodiment, the first signal includes a wireless signal.

As an embodiment, the first signal includes a radio frequency signal.

As an embodiment, the scheduling information includes one or more of time domain resources, frequency domain resources, MCS, DMRS port, HARQ process number, redundancy version (RV) or new data indicator (NDI).

As an embodiment, the second node estimates the received signal-to-noise ratio of the first signal as the first signal-to-noise ratio, and the first signal-to-noise ratio and K channel quality indications are jointly used to determine the MCS of the first signal.

As an embodiment, the reference first type value is the first type value closest to the first signal-to-noise ratio among the K first type values, and the second node selects the modulation scheme and code rate corresponding to the K channel quality indications and the channel quality indications corresponding to the reference first type value as the MCS of the first signal.

As an embodiment, the sender of the first signal interpolates the K channel quality indications and K first type values to obtain the channel quality indication corresponding to the first signal-to-noise ratio, and then selects the modulation scheme and code rate corresponding to the channel quality indication corresponding to the first signal-to-noise ratio as the MCS of the first signal.

As an embodiment, neither the operations in box F54 nor box F55 in FIG. 5 exist.

Sixth Embodiment

The sixth embodiment illustrates a schematic diagram where the time domain position of the first reference resource block according to an embodiment of the present application is associated with the temporal resources occupied by the first information block, as shown in FIG. 6.

As an embodiment, the first reference resource block is a CSI reference resource corresponding to the CSI included in the first information block.

As an embodiment, the first reference resource block is common to the K channel quality indications.

As an embodiment, the CSI reference resource corresponding to any of the K channel quality indications is the first reference resource block.

As an embodiment, the first reference resource block includes both time-domain resources and frequency-domain resources.

As an embodiment, the first reference resource block includes time-frequency resources and code domain resources.

As an embodiment, the first reference resource block occupies a positive integer RE greater than 1 in the time-frequency domain.

As an embodiment, RE occupies one multi carrier symbol in the time domain and one subcarrier in the frequency domain.

As an embodiment, the multi carrier symbol is an orthogonal frequency division multiplexing (OFDM) symbol.

As an embodiment, the multi carrier symbol is a single carrier frequency division multiple access (SC-FDMA) symbol.

As an embodiment, the multi carrier symbol is a discrete Fourier transform spread OFDM (DFT-S-OFDM) symbol.

As an embodiment, the first reference resource block occupies a positive integer number of PRBs in the frequency domain.

As an embodiment, the first reference resource block occupies a positive integer of multiple carrier symbols in the time domain.

As an embodiment, the first reference resource block occupies one time slot in the time domain.

As an embodiment, the first reference resource block occupies a positive integer of multiple carrier symbols in one time slot in the time domain.

As an embodiment, the time domain resources occupied by the first information block are used to determine the time domain resources occupied by the first reference resource block.

As an embodiment, a first time unit is a time unit to which the first information block belongs, and the first time unit is used to determine the time domain resources occupied by the first reference resource block.

As an embodiment, the first reference resource block is located before the first time unit in the time domain.

As an embodiment, the first reference resource block belongs to the first time unit.

As an embodiment, the first reference resource block does not belong to the first time unit.

As an embodiment, the first reference resource block is located in the time domain after the first time unit.

As an embodiment, a target time unit is used to determine the time domain resources occupied by the first reference resource block, the target time unit is no later than a reference time unit, and the first time unit is used to determine the reference time unit; the time interval between the target time unit and the reference time unit is a first interval; the first interval is a non negative integer.

As a sub embodiment of the above embodiment, the reference time unit is the first time unit.

As a sub embodiment of the above embodiment, the first time unit is time unit n1, the reference time unit is time unit n, the n is equal to the product of n1 and the first ratio rounded down, the first ratio is the ratio between the first parameter power of 2 and the second parameter power of 2, and the first parameter is the subcarrier spacing configuration corresponding to the first reference signal group. The second parameter is the subcarrier interval configuration corresponding to the second information block.

As a sub embodiment of the above embodiment, the unit of the first interval is the time unit.

As a sub embodiment of the above embodiment, the first interval is not less than the third parameter and makes the target time unit a value that can be used by the sender of the first reference signal group to transmit wireless signals to the first node; the third parameter is a non negative integer.

As a sub embodiment of the above embodiment, the first interval is a value that is not less than the third parameter and makes the target time unit a valid downlink time unit; the third parameter is a non negative integer.

As a sub embodiment of the above embodiment, at least one of the delay requirements or subcarrier interval configurations corresponding to the first reference signal group is used to determine the third parameter.

As a sub embodiment of the above embodiment, the first reference resource block belongs to the target time unit.

As a sub embodiment of the above embodiment, the M reference resource sub-blocks all belong to the target time unit.

As a sub embodiment of the above embodiment, the latest reference resource sub block among the M reference resource sub-blocks belongs to the target time unit.

As a sub embodiment of the above embodiment, the earliest reference resource sub block among the M reference resource sub-blocks belongs to the target time unit.

As an embodiment, the first reference resource block occupies a positive integer of multiple carrier symbols in the time unit to which it belongs in the time domain.

As an embodiment, the first reference resource block does not occupy the earliest two multi carrier symbols in the time unit to which it belongs.

As an embodiment, a time unit is a time slot, and the first reference resource block occupies the last 12 multi carrier symbols in the corresponding time unit.

As an embodiment, the M reference resource sub-blocks each belong to M consecutive time units that can be used by the sender of the first reference signal group to transmit wireless signals to the first node.

As an embodiment, the M reference resource sub-blocks each belong to M consecutive effective downlink time units.

As an embodiment, a time unit is a time slot.

As an embodiment, a time unit is a sub slot.

As an embodiment, a time unit is a multi-carrier symbol.

As an embodiment, a time unit is composed of a continuous multi carrier symbol of a positive integer greater than 1.

As an embodiment, the frequency domain position of the first reference resource block is associated with the frequency domain resource targeted by the CSI included in the first information block.

As an embodiment, the CSI included in the first information block is obtained for a first subband set, which is used to determine the frequency domain resources occupied by the first reference resource block.

As an embodiment, the CQI included in the first information block is obtained for a first subband set, which is used to determine the frequency domain resources occupied by the first reference resource block.

As an embodiment, the first subband set only includes 1 subband.

As an embodiment, the first subband set includes positive integer subbands greater than 1.

As an embodiment, the first subband set includes positive integer subbands greater than 1 that are continuous in the frequency domain.

As an embodiment, the first subband set includes positive integer subbands greater than 1 that are discontinuous in the frequency domain.

As an embodiment, the number of PRBs included in any two sub bands in the first sub band set is the same.

As an embodiment, any two sub bands in the first sub band set are orthogonal to each other in the frequency domain.

As an embodiment, the first reporting configuration indicates the first set of subbands.

As an embodiment, the first field in the first reporting configuration indicates the set of first subbands.

As a sub embodiment of the above embodiment, the first domain includes all or part of the information in the csi-ReportingBand domain in the CSI-ReportConfig information element (IE).

As a sub embodiment of the above embodiment, the first domain includes all or part of the information in the reportFreqConfiguration domain in CSI-ReportConfig IE.

As a sub embodiment of the above embodiment, the first domain includes information from one or more domains within one IE.

As an embodiment, the frequency domain resources occupied by the first reference resource block include one or more subbands in the first subband set.

As an embodiment, the frequency domain resources occupied by the first reference resource block belong to the first subband set.

As an embodiment, the first reference resource block occupies all subbands in the first subband set.

As an embodiment, the first reference resource block occupies only partial molecular bands in the first subband set.

As an embodiment, the same subband set includes positive integer subbands in the first subband set.

As an embodiment, the same subband set is composed of positive integer subbands from the first subband set.

As an embodiment, the same subband set is the first subband set.

As an embodiment, the same subband set only includes a portion of the first subband set.

Seventh Embodiment

The seventh embodiment illustrates a schematic diagram of an embodiment of the present application in which K first type values are an equal ratio sequence, as shown in FIG. 7. In FIG. 7, the indices of the K first type values are #0, . . . , # (K−1), respectively.

As an embodiment, the K first type values are an equal ratio sequence.

As an embodiment, the K first type values are an equal ratio sequence, and the ratio between any two adjacent first type values among the K first type values is predefined.

As an embodiment, the K first type values are an equal ratio sequence, and the ratio between any two adjacent first type values in the K first type values is configured for higher layer signaling.

As an embodiment, the K first type values are an equal ratio sequence, and the ratio between any two adjacent first type values in the K first type values is configured for RRC signaling.

As an embodiment, the K first type values are an equal ratio sequence, and the ratio between any two adjacent first type values in the K first type values is dynamically configured for signaling.

As an embodiment, the K first type values are an equal ratio sequence, and the first reporting configuration indicates the ratio between any two adjacent first type values among the K first type values.

As an embodiment, the K first type values are an equal ratio sequence, and the first information block indicates the ratio between any two adjacent first type values among the K first type values.

Eighth Embodiment

The eighth embodiment illustrates a schematic diagram of K first type values being an equal difference sequence according to an embodiment of the present application, as shown in FIG. 8. In FIG. 8, the indices of the K first type values are #0, . . . , # (K−1), respectively.

As an embodiment, the K first type values are an equal difference sequence.

As an embodiment, the K first type values are an equal difference sequence, and the difference between any two adjacent first type values among the K first type values is predefined.

As an embodiment, the K first type values are an equal difference sequence, and the difference between any two adjacent first type values in the K first type values is configured for higher layer signaling.

As an embodiment, the K first type values are an equal difference sequence, and the difference between any two adjacent first type values in the K first type values is configured by RRC signaling.

As an embodiment, the K first type values are an equal difference sequence, and the difference between any two adjacent first type values in the K first type values is dynamically configured for signaling.

As an embodiment, the K first type values are an equal difference sequence, and the first reporting configuration indicates the difference between any two adjacent first type values among the K first type values.

As an embodiment, the K first type values are an equal difference sequence, and the first information block indicates the difference between any two adjacent first type values among the K first type values.

Ninth Embodiment

The ninth embodiment illustrates a schematic diagram of the spatial correlation between the first reference resource block and the first reference signal according to an embodiment of the present application; as shown in FIG. 9.

As an embodiment, the first reference signal includes CSI-RS.

As an embodiment, the first reference signal includes an SSB.

As an embodiment, the first reference signal includes SRS.

As an embodiment, the first reference signal group is composed of the first reference signal.

As an embodiment, the first reference signal group includes at least one reference signal in addition to the first reference signal.

As an embodiment, the first information block indicates the first reference signal.

As an embodiment, the first information block indicates the first reference signal from the first reference signal group.

As an embodiment, the first information block indicates the index of the first reference signal in the first reference signal group.

As an embodiment, the first information block indicates the identification of the first reference signal.

As an embodiment, the identification of any reference signal in the first reference signal group is SSB-Index or NZP-CSI-RS-Re sourceId.

As an embodiment, the first reference signal is used for channel measurement.

As an embodiment, the first reference signal is used for channel measurement of the first reporting configuration.

As an embodiment, the first information block includes a first CRI, which indicates the first reference signal.

As an embodiment, any of the K channel quality indications is obtained under the conditions of the first CRI.

As an embodiment, any of the K channel quality indications is obtained under the conditions of the first reference signal.

As an embodiment, any of the K condition sets includes: the first reference resource block and the first reference signal spatially correlated.

As an embodiment, the DMRS port carrying the PDSCH of the first bit block and the first reference signal QCL.

As an embodiment, the DMRS port carrying the PDSCH of the first bit block and the first reference signal QCL correspond to QCL TypeD.

As an embodiment, the first node is configured to only obtain channel measurements for calculating the quality of the K channels based on the first reference signal before the first reference resource block.

As an embodiment, the first node is configured to only obtain channel measurements for calculating the quality of the K channels based on the first reference signal closest to the first reference resource block.

As an embodiment, the first node is configured to only obtain interference measurements for calculating the quality of the K channels based on the first reference signal before the first reference resource block.

As an embodiment, the first node is configured to only obtain interference measurements for calculating the quality of the K channels based on the first reference signal closest to the first reference resource block.

Tenth Embodiment

The tenth embodiment illustrates a schematic diagram of spatial correlation between a given reference resource block and a given reference signal according to an embodiment of the present application, as shown in FIG. 10. In the tenth embodiment, the given reference resource block is any reference resource sub block among the first reference resource block or M reference resource sub-blocks, and the given reference signal is any reference signal among the first reference signal or M reference signals.

As an embodiment, the given reference resource block is the first reference resource block, and the given reference signal is the first reference signal.

As an embodiment, the given reference resource block is any reference resource sub block among the M reference resource sub-blocks, and the given reference signal is a reference signal spatially related to the M reference signals and the given reference resource sub block.

As an embodiment, the spatial correlation includes QCL.

As an embodiment, the spatial correlation includes QCL and corresponds to QCL type A.

As an embodiment, the spatial correlation includes QCL and corresponds to QCL type B.

As an embodiment, the spatial correlation includes QCL and corresponds to QCL type C.

As an embodiment, the spatial correlation includes QCL and corresponds to QCL type D.

As an embodiment, the meaning related to the given reference resource block and the given reference signal space in the expression includes: DMRS of the physical layer channel transmitted in the given reference resource block and the given reference signal QCL.

As an embodiment, the meaning of the given reference resource block and the given reference signal space in the expression includes: DMRS of the physical layer channel transmitted in the given reference resource block and the given reference signal QCL corresponding to QCL TypeD.

As an embodiment, the meaning related to the given reference resource block and the given reference signal space in the expression includes: DMRS of the physical layer channel transmitted in the given reference resource block and the given reference signal QCL corresponding to QCL TypeA.

As an embodiment, the meaning of the given reference resource block and the given reference signal space includes: the given reference signal is used to determine the large-scale characteristics of the channel experienced by the physical layer channel transmitted in the given reference resource block.

As an embodiment, the meaning of a given reference resource block and a given reference signal space includes: the large-scale characteristics of the channel experienced by the physical layer channel transmitted in the given reference resource block can be inferred from the large-scale characteristics of the channel experienced by the given reference signal.

As an embodiment, the large-scale properties include one or more of delay spread, Doppler spread, Doppler shift, average delay, or spatial Rx parameters.

As an embodiment, the meaning of the given reference resource block and the given reference signal space includes: the given reference signal is used to determine the spatial domain filter corresponding to the physical layer channel transmitted in the given reference resource block.

As an embodiment, the meaning of the given reference resource block and the given reference signal space in the expression includes: the first node uses the same spatial filter to receive the given reference signal and the physical layer channel transmitted in the given reference resource block.

As an embodiment, the meaning of the given reference resource block and the given reference signal space includes: the transmission antenna port of the given reference signal is used to determine the transmission antenna port of the physical layer channel transmitted in the given reference resource block.

As an embodiment, the meaning of the given reference resource block and the given reference signal space in the expression includes: the physical layer channel transmitted in the given reference resource block and the given reference signal being transmitted by the same antenna port.

As an embodiment, the physical layer channel includes PDSCH.

As an embodiment, the physical layer channel includes PSSCH.

Eleventh Embodiment

The eleventh embodiment illustrates a schematic diagram of a first reference signal and a first power value according to an embodiment of the present application; as shown in FIG. 11. In the eleventh embodiment, the first reference signal is measured by the first node to determine the first power value.

As an embodiment, channel measurement for the first reference signal is used to determine the first power value.

As an embodiment, the first power value is the RSRP of the first reference signal.

As an embodiment, the first power value is the linear average of the power contribution of the RE carrying the first reference signal.

As an embodiment, the first power value is the dB value of the linear average of the power contribution of the RE carrying the first reference signal.

As an embodiment, the second power value is the linear average of the interference power contribution of the RE carrying the first reference signal.

As an embodiment, the second power value is the dB value of the linear average of the interference power contribution of the RE carrying the first reference signal.

As an embodiment, the second power value is the linear average of the interference and noise power contributions of the RE carrying the first reference signal.

As an embodiment, the second power value is the dB value of the linear average of the interference and noise power contributions of the RE carrying the first reference signal.

Twelfth Embodiment

The twelfth embodiment illustrates a schematic diagram of a second reference signal resource and a second power value according to an embodiment of the present application, as shown in FIG. 12. In the twelfth embodiment, the second reference signal resource is measured by the first node to determine the second power value.

As an embodiment, the second reference signal resource includes a CSI-RS resource.

As an embodiment, the second reference signal resource includes a CSI-RS resource set.

As an embodiment, the second reference signal resource includes an SSB resource.

As an embodiment, the second reference signal resource includes SRS resources.

As an embodiment, the second reference signal resource includes CSI-interference measurement (IM) resources.

As an embodiment, the second reference signal resource includes a CSI-IM resource set.

As an embodiment, the second reference signal resource belongs to the first reference signal resource group.

As an embodiment, the second reference signal resource is reserved for the first reference signal.

As an embodiment, the second reference signal resource does not belong to the first reference signal resource group.

As an embodiment, the second reference signal resource is used for interference measurement.

As an embodiment, the second reference signal resource is used for interference measurement of the first reporting configuration.

As an embodiment, the first reference signal group and the second reference signal resource are respectively configured by different fields in the same IE.

As an embodiment, the second reference signal resource belongs to the second reference signal resource group; the first information block indicates the second reference signal resource from the second reference signal resource group.

As an embodiment, the second reference signal resource group includes 1 or more positive integer reference signal resources; any reference signal resource in the second reference signal resource group includes one of CSI-RS resource, SSB resource, or CSI-IM resource.

As an embodiment, the second reference signal resource group is the first reference signal resource group.

As an embodiment, the second reference signal resource group includes a reference signal resource that does not belong to the first reference signal resource group.

As an embodiment, any reference signal resource in the second reference signal resource group does not belong to the first reference signal resource group.

As an embodiment, the number of reference signals included in the first reference signal group is equal to the number of reference signal resources included in the second reference signal resource group.

As an embodiment, all reference signal resources in the second reference signal resource group are sequentially indexed in the second reference signal resource group.

As an embodiment, the second reference signal resource group is used for interference measurement.

As an embodiment, the first information block includes a first CRI, which indicates the second reference signal resource.

As an embodiment, the value of the first CRI is equal to P, which is a non negative integer less than the number of reference signals included in the first reference signal group; the first reference signal is the (P+1)th reference signal in the first reference signal group; and the second reference signal resource is the (P+1)th reference signal resource in the second reference signal resource group.

As an embodiment, the first reference signal group and the second reference signal resource group are respectively configured by different fields in the same IE.

As an embodiment, the first node only obtains interference measurements for calculating the quality of the K channels based on the second reference signal resource before the first reference resource block.

As an embodiment, the first node only obtains interference measurements for calculating the quality of the K channels based on the second reference signal resource closest to the first reference resource block.

As an embodiment, interference measurement for the second reference signal resource is used to determine the second power value.

As an embodiment, the second power value is the RSRP of the reference signal transmitted in the second reference signal resource.

As an embodiment, the second power value is the linear average of the power contribution of RE occupied by the second reference signal resource.

As an embodiment, the second power value is the dB value of the linear average of the power contribution of the RE occupied by the second reference signal resource.

As an embodiment, the second power value is the linear average of the interference power contribution of the RE occupied by the second reference signal resource.

As an embodiment, the second power value is the dB value of the linear average contribution of the interference power of the RE occupied by the second reference signal resource.

As an embodiment, the second power value is the linear average of the interference and noise power contributions of the RE occupied by the second reference signal resource.

As an embodiment, the second power value is the dB value of the linear average of the interference and noise power contributions of the RE occupied by the second reference signal resource.

Thirteenth Embodiment

The thirteenth embodiment illustrates a schematic diagram of a first power value, a second power value, and K first type values according to an embodiment of the present application; as shown in FIG. 13. In the thirteenth embodiment, the first power value and the second power value are used by the first node to determine K first type values.

As an embodiment, the first power value and the second power value are real numbers, respectively.

As an embodiment, the first power value and the second power value are non-negative real numbers, respectively.

As an embodiment, the units of the first power value and the units of the second power value are dB, respectively.

As an embodiment, the first power value is the signal power.

As an embodiment, the second power value is interference power.

As an embodiment, the second power value is interference and noise power.

As an embodiment, the first power value and the second power value are used to determine a target value, and the target value is used to determine K first type values.

As an embodiment, the first power value, the second power value, and the fifth power value are used to determine the target value, and the fifth power value is the noise power.

As an embodiment, the target value is equal to the ratio of the first power value to the second power value.

As an embodiment, the target value is equal to a quantized value of the ratio of the first power value to the second power value.

As an embodiment, the target value is equal to the difference between the first power value and the second power value.

As an embodiment, the target value is equal to a quantized value of the difference between the first power value and the second power value.

As an embodiment, the target value is equal to the first power value divided by the sixth power value, which is the sum of the second power value and the fifth power value.

As an embodiment, the target value is equal to the quantized value after dividing the first power value by the sixth power value, which is the sum of the second power value and the fifth power value.

As an embodiment, the target value is equal to the first power value minus the second power value and then minus the fifth power value.

As an embodiment, the target value is equal to the quantized value obtained by subtracting the first power value from the second power value and then subtracting the fifth power value.

As an embodiment, the fifth power value is a real number.

As an embodiment, the fifth power value is a non negative real number.

As an embodiment, the unit of the fifth power value is dB.

As an embodiment, the target value is one of the K first type values.

As an embodiment, the position of the target value among the K first type values is default.

As an embodiment, the position of the target value among the K first type values does not require signaling configuration.

As an embodiment, the position of the target value among the K first type values does not require dynamic signaling configuration.

As an embodiment, the target value is the first of the K first type values.

As an embodiment, the target value is the last first type value among the K first type values.

As an embodiment, the target value is the $K/2_{th}$ first type value among the K first type values.

As an embodiment, the target value is the $K/2_{th}$ first type value among the K first type values.

As an embodiment, the target value is different from any of the K first type values.

As an embodiment, the target value and the first step size are jointly used to determine the K first type values.

As an embodiment, the target value is one of the K first type values, and the difference between any of the K first type values and the target value is an integer multiple of the first step size.

As an embodiment, the target value is the i-th first type value among the K first type values; the $j_{th}$ first type value among the K first type values is equal to the sum of the target value and the fourth value, and the fourth value is equal to the product of (j–i) and the first step size; i is a positive integer not greater than K, and j is any positive integer not greater than K.

As an embodiment, the target value is one of the K first type values, and any first type value among the K first type values is equal to the target value multiplied by the integer power of the first step size.

As an embodiment, the target value is the $i_{th}$ first type value among the K first type values. The $j_{th}$ first type value among the K first type values is equal to the product of the target value and the fifth value, and the fifth value is equal to the $(j–i)_{th}$ power of the first step size, where i is a positive integer not greater than K, and j is any positive integer not greater than K.

As an embodiment, the first step size is a real number.

As an embodiment, the first step size is a positive real number.

As an embodiment, the unit of the first step size is dB.

As an embodiment, the first step size is configured for higher-level signaling.

As an embodiment, the first step size is configured for RRC signaling.

As an embodiment, the first step size is indicated by the first reporting configuration.

As an embodiment, the first step size is dynamically configured for signaling.

As an embodiment, the first information block indicates the first step size.

As an embodiment, the target value is one of the K first type values, and the target channel quality indication is the channel quality indication corresponding to the K channel quality indications and the target value.

As an embodiment, the position of the target channel quality indication among the K channel quality indications is default.

As an embodiment, the position of the target channel quality indication among the K channel quality indications does not require signaling configuration.

As an embodiment, the position of the target channel quality indication among the K channel quality indications does not require dynamic signaling configuration.

Fourteenth Embodiment

The fourteenth embodiment illustrates a schematic diagram of the spatial correlation between M reference resource blocks and M reference signals according to an embodiment of the present application, as shown in FIG. 14. In FIG. 14, the indexes of the M reference resource blocks and M reference signals are #0, . . . , # (M−1), respectively.

As an embodiment, the M reference resource sub-blocks are mutually orthogonal in the time-frequency domain.

As an embodiment, the M reference resource sub-blocks are mutually orthogonal in the time domain.

As an embodiment, the M reference resource sub-blocks are mutually orthogonal in the frequency domain.

As an embodiment, the expression that "the first bit block occupying the first reference resource block" means that: the first bit block occupies each reference resource sub block among the M reference resource sub-blocks.

As an embodiment, the expression that "the first bit block occupying the first reference resource block" means that: the first bit block is repeatedly transmitted M times in each of the M reference resource sub-blocks.

As an embodiment, any two reference resource sub-blocks in the M reference resource sub-blocks occupy the same frequency domain resources.

As an embodiment, any two reference resource sub-blocks in the M reference resource sub-blocks occupy the same time domain resources.

As an embodiment, the size of the time domain resources occupied by any reference resource sub block among the M reference resource sub-blocks is independent of the M.

As an embodiment, the size of the frequency domain resources occupied by any reference resource sub block among the M reference resource sub-blocks is independent of the M.

As an embodiment, the M is configurable.

As an embodiment, the M is greater than 2.

As an embodiment, the M is equal to 2.

As an embodiment, the first information block indicates the M.

As an embodiment, the M is configured by RRC signaling.

As an embodiment, the M is configured by MAC CE signaling.

As an embodiment, the M is configured by dynamic signaling.

As an embodiment, the first reporting configuration indicates the M.

As an embodiment, the QCL refers to: Quasi Co Located.

As an embodiment, any two reference signals in the M reference signals mentioned in the expression cannot be assumed to be QCL, which means that any two reference signals in the M reference signals cannot be assumed to be QCL and correspond to QCL TypeD.

As an embodiment, the first reference signal group is composed of M reference signals.

As an embodiment, the first reference signal group includes at least one reference signal in addition to the M reference signals.

As an embodiment, the first information block indicates the M reference signals.

As an embodiment, the first information block indicates M reference signals from the first reference signal group.

As an embodiment, the first information block indicates the index of each of the M reference signals in the first reference signal group.

As an embodiment, the first information block indicates the identification of each reference signal among the M reference signals.

As an embodiment, the M reference signals include CSI-RS.

As an embodiment, the M reference signals include SSBs.

As an embodiment, the first information block includes a first CRI set, which indicates the M reference signals.

As an embodiment, the first CRI set includes M CRIs, each of which indicates the M reference signals.

As an embodiment, any of the K channel quality indications is obtained under the conditions of the first CRI set.

As an embodiment, any of the K channel quality indications is obtained under the conditions of the M reference signals.

As an embodiment, any of the K condition sets includes: the M reference resource sub-blocks are spatially related to the M reference signals, respectively.

As an embodiment, the PDSCH carrying the first bit block is located at the DMRS port and corresponding reference signal QCL in any of the M reference resource blocks.

As an embodiment, the PDSCH carrying the first bit block corresponds to the QCL TypeD on the DMRS port and corresponding reference signal QCL in any of the M reference resource blocks.

As an embodiment, the first node only obtains channel measurements for calculating the quality of the K channels based on the M reference signals before the first reference resource block.

As an embodiment, the first node only obtains channel measurements for calculating the quality of the K channels based on the M reference signals closest to the first reference resource block.

As an embodiment, the first node only obtains interference measurements for calculating the quality of the K channels based on the M reference signals before the first reference resource block.

As an embodiment, the first node only obtains interference measurements for calculating the quality of the K channels based on the M reference signals closest to the first reference resource block.

Fifteenth Embodiment

The fifteenth embodiment illustrates a schematic diagram of M reference signals and M first type power values according to an embodiment of the present application, as shown in FIG. 15. In the fifteenth embodiment, the M reference signals are measured by the first node to determine the M first type power values, respectively. In FIG. 15, the indices of the M reference signals and M first type power values are #0, . . . , # (M−1), respectively.

As an embodiment, the M first type power values are respectively the RSRP of the M reference signals.

As an embodiment, the M first type power values are the linear average of the power contributions of RE carrying the M reference signals.

As an embodiment, the M first type power values are the dB values of the linear average power contribution of the RE carrying the M reference signals.

As an embodiment, the M second type power values are the linear average of the interference power contributions of the RE carrying the M reference signals.

As an embodiment, the M second type power values are the dB values of the linear average contribution of the interference power of the RE carrying the M reference signals, respectively.

As an embodiment, the M second type power values are the linear average of the interference and noise power contributions of the RE carrying the M reference signals, respectively.

As an embodiment, the M second type power values are the dB values of the linear average of the interference and noise power contributions of the RE carrying the M reference signals, respectively.

Sixteenth Embodiment

The sixteenth embodiment illustrates a schematic diagram of M reference signal resources and M second type power values according to an embodiment of the present application, as shown in FIG. 16. In the sixteenth embodiment, the M reference signal resources are measured by the first node to determine the M second type power values, respectively. In FIG. 16, the indexes of the M reference signal resources and M second type power values are #0, . . . , # (M−1), respectively.

As an embodiment, the M reference signal resources are respectively reserved for the M reference signals.

As an embodiment, any of the M reference signal resources belongs to the first reference signal resource group.

As an embodiment, one of the M reference signal resources does not belong to the first reference signal resource group.

As an embodiment, any of the M reference signal resources does not belong to the first reference signal resource group.

As an embodiment, the first reference signal group and the M reference signal resources are respectively configured by different fields in the same IE.

As an embodiment, the M reference signals are in a one-to-one correspondence to the M reference signal resources.

As an embodiment, the M reference signal resources are a subset of the second reference signal resource group.

As an embodiment, for any given reference signal among the M reference signals, the given reference signal is the $X_{th}$ reference signal in the first reference signal group, and the reference signal resource corresponding to the M reference signal resource and the given reference signal is the $X_{th}$ reference signal resource in the second reference signal resource group. X is any positive integer not greater than the number of reference signals included in the first reference signal group.

As an embodiment, the first information block includes a first CRI set, which indicates the M reference signal resources.

As an embodiment, the first CRI set includes M CRIs, each of which indicates the M reference signals and the M reference signal resources. For any given CRI among the M CRIs, the value of the given CRI is equal to P1, and P1 is a non negative integer smaller than the number of reference signals included in the first reference signal set. The reference signals corresponding to the given CRI in the M reference signals are the $(P1+1)_{th}$ reference signal in the first reference signal group; the M reference signal resources and the reference signal resources corresponding to the given CRI are the (P1+1) th reference signal resources in the second reference signal resource group.

As an embodiment, the first node only obtains interference measurements for calculating the quality of the K channels based on the M reference signal resources before the first reference resource block.

As an embodiment, the first node only obtains interference measurements for calculating the quality of the K channels based on the M reference signal resources closest to the first reference resource block.

As an embodiment, the M second type power values are the RSRP of the reference signals transmitted within the M reference signal resources.

As an embodiment, the M second type power values are the linear average of the power contributions of the RE occupied by the M reference signal resources, respectively.

As an embodiment, the M second type power values are respectively the dB values of the linear average power contribution of the RE occupied by the M reference signal resources.

As an embodiment, the M second type power values are the linear average of the interference power contribution of the RE occupied by the M reference signal resources.

As an embodiment, the M second type power values are respectively the dB values of the linear average contribution of the interference power of the RE occupied by the M reference signal resources.

As an embodiment, the M second type power values are the linear average of the interference and noise power contributions of the RE occupied by the M reference signal resources, respectively.

As an embodiment, the M second type power values are the dB values of the linear average of the interference and noise power contributions of the RE occupied by the M reference signal resources, respectively.

Seventeenth Embodiment

The seventeenth embodiment illustrates a schematic diagram of M first type power values, M second type power values, and K first type values according to an embodiment of the present application; as shown in FIG. 17. In the seventeenth embodiment, the M first type power values and M second type power values are jointly used by the first node to determine the K first type values.

As an embodiment, the M first type power values and the M second type power values are used to determine a target value, and the target value is used to determine the K first type values.

As an embodiment, the first power value is the linear average of the M first type power values, and the second power value is the linear average of the M second type power values. The first power value and the second power value are used to determine the K first type values.

As an embodiment, the first power value is the dB value of the linear average of the M first type power values, and the second power value is the dB value of the linear average of the M second type power values. The first power value and the second power value are used to determine the K first type values.

As an embodiment, the M first type power values and M reference values correspond one-to-one, and the M second type power values and M reference values correspond one-to-one. The M first type power values and M second type power values are used to determine the M reference values, and the M reference values are used to generate the target values.

As an embodiment, any of the M reference values is the ratio of the corresponding first type power value to the corresponding second type power value.

As an embodiment, any of the M reference values is the difference between the corresponding first type power value and the corresponding second type power value.

As an embodiment, the target value is the linear average of the M reference values.

As an embodiment, the target value is the dB value of the linear average of the M reference values.

Eighteenth Embodiment

The eighteenth embodiment illustrates a schematic diagram of a second information block according to an embodiment of the present application, as shown in FIG. 18. In the eighteenth embodiment, the second information block indicates the first reporting configuration, the first reporting configuration indicates the first reporting quantity set and the first reference signal group, and the first reporting quantity set is used by the first node to determine the content of the first information block.

As an embodiment, the second information block is carried by higher layer signaling.

As an embodiment, the second information block is carried by RRC signaling.

As an embodiment, the second information block is carried by MAC CE signaling.

As an embodiment, the second information block is jointly carried by RRC signaling and MAC CE.

As an embodiment, the second information block includes all or part of the information in the Field of an IE.

As an embodiment, the second information block includes all or part of the information in the Field in CSI-ReportConfig IE.

As an embodiment, the name of the signaling carrying the second information block includes CSI.

As an embodiment, the first reporting configuration includes all or part of the information in the Field within an IE.

As an embodiment, the first reporting configuration is an IE.

As an embodiment, the first reporting configuration includes information in all or part of the domains in CSI-ReportConfig IE.

As an embodiment, the first reporting configuration is CSI-ReportConfig IE.

As an embodiment, the first information block includes a one-time report of the first report configuration.

As an embodiment, the first reporting configuration includes a fourth domain, and the fourth domain in the first reporting configuration indicates the set of first reporting quantities.

As an embodiment, the fourth domain includes information from one or more domains within an IE.

As an embodiment, the fourth domain includes information in the reportQuantity domain in CSI-ReportConfig IE.

As an embodiment, the first reporting quantity set includes one or more of CQI, RI, PMI, CRI, SSBRI, layer indicator (LI), L1 (Layer 1)-RSRP or L1 SINR.

As an embodiment, the first reporting configuration sequentially indicates all reference signals in the first reference signal group.

As an embodiment, the first reporting configuration includes a second domain, and the second domain in the first reporting configuration indicates the first reference signal group.

As an embodiment, the second domain includes information from one or more domains within an IE.

As an embodiment, the second domain includes information in at least one of the resourcesForChannelMeasurement domain, csi-IM ResourcesForinterference domain, or nzp-CSI-RS-ResourcesForInterference domain in CSI-ReportConfig IE.

As an embodiment, the first reporting configuration indicates the second reference signal resource.

As an embodiment, the first reporting configuration indicates the second reference signal resource group.

As an embodiment, the first reporting configuration sequentially indicates all reference signal resources in the second reference signal resource group.

As an embodiment, the first reporting configuration includes a third domain, and the third domain in the first reporting configuration indicates the second reference signal resource.

As an embodiment, the first reporting configuration includes a third domain, and the third domain in the first reporting configuration indicates the second reference signal resource group.

As an embodiment, the third domain includes information from one or more domains within an IE.

As an embodiment, the third domain includes information in at least one of the csi IM ResourcesForinterference domain or nzp CSI RS ResourcesForinterference domain in CSI ReportConfig IE.

As an embodiment, the first report configuration indicates that a report of the first report quantity set is obtained based on channel measurements for the first reference signal group.

As an embodiment, the first reporting configuration indicates that a report of the first reporting quantity set is obtained based on interference measurements for the first reference signal group.

As an embodiment, the first reporting configuration indicates that a report of the first reporting quantity set is obtained based on interference measurements for the second reference signal resource group.

As an embodiment, the content of the first information block includes one or more of CQI, RI, PMI, CRI, SSBRI, LI, L1-RSRP, or L1-SINR.

As an embodiment, the content of the first information block includes one report of each report quantity in the first report quantity set.

Nineteenth Embodiment

The nineteenth embodiment illustrates a structural block diagram of a processing device for a first node device according to an embodiment of the present application, as shown in FIG. 19. In FIG. 19, the processing device 1900 in the first node device includes a first receiver 1901 and a first transmitter 1902.

In the nineteenth embodiment, the first receiver 1901 is configured to receive the first reference signal group within the first reference signal resource group, and the first transmitter 1902 is configured to transmit the first information block.

In the nineteenth embodiment, the first information block is generated by measuring the first reference signal group. The first information block includes K channel quality indications, and K is a positive integer greater than 1. The K channel quality indications correspond to K first type values, respectively, the K first type values are not equal to each other, and the K channel quality indications correspond to a same set of subbands. The K channel quality indications correspond to K condition sets respectively. A first channel quality indication is any channel quality indication in the K channel quality indications, and the first channel quality indication corresponds to the first condition set in the K condition sets. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first bit block is transmitted in a transmission method corresponding to the first channel quality indication. The first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

As an embodiment, the K first type values are an equal ratio sequence.

As an embodiment, the K first type values are an equal difference sequence.

As an embodiment, the first reference resource block is spatially correlated with the first reference signal, and the first reference signal belongs to the first reference signal group.

As an embodiment, the first reference signal is measured to determine the first power value, and the second reference signal resource is measured to determine the second power value. The first power value and the second power value are used to determine the K first type values.

As an embodiment, the first reference resource block includes M reference resource sub-blocks, where M is a positive integer greater than 1; the M reference resource sub-blocks are spatially correlated with M reference signals, which are subsets of the first reference signal group; any two reference signals in the M reference signals cannot be assumed to be QCL.

As an embodiment, the problem to be solved by the above method includes how to improve the feedback accuracy of channel quality indication when repeated transmission based on multiple TRPs is used to transmit data channels. The above method solves this problem by allowing multiple reference resource sub-blocks to be correlated with different reference signal spaces.

As an embodiment, the M reference signals are measured to determine M first type power values, and the M reference signal resources are measured to determine M second type power values. The M first type power values and the M second type power values are jointly used to determine K first type values.

As an embodiment, the first receiver 1901 is configured to receive a second information block, where the second information block indicates a first reporting configuration. The first reporting configuration indicates a set of first reporting quantities and a set of first reference signals, and the first reporting quantity set is used to determine the content of the first information block.

As an embodiment, the first node device is a UE.

As an embodiment, the first node device is a relay node device.

As an embodiment, the first receiver 1901 includes at least one of the antenna 452, the receiver 454, the receiving processor 456, the multi antenna receiving processor 458, the controller/processor 459, the memory 460, and the data source 467 in the fourth embodiment.

As an embodiment, the first transmitter 1902 includes at least one of the antenna 452, the transmitter 454, the transmitting processor 468, the multi antenna transmitting processor 457, the controller/processor 459, the memory 460, and the data source 467 in the fourth embodiment.

Twentieth Embodiment

The twentieth embodiment illustrates a structural block diagram of a processing device for a second node device according to an embodiment of the present application, as shown in FIG. 20. In FIG. 20, the processing device 2000 in the second node device includes a second transmitter 2001 and a second receiver 2002.

In the twentieth embodiment, the second transmitter 2001 is configured to transmit the first reference signal group within the first reference signal resource group, and the second receiver 2002 is configured to receive the first information block.

In the twentieth embodiment, the first information block is generated by measuring the first reference signal group. The first information block includes K channel quality indications, and K is a positive integer greater than 1. The K channel quality indications correspond to K first type values, respectively, the K first type values are not equal to each other, and the K channel quality indications correspond to a same set of subbands. The K channel quality indications correspond to K condition sets respectively. A first channel quality indication is any channel quality indication in the K channel quality indications, and the first channel quality indication corresponds to the first condition set in the K condition sets. The first channel quality indication indicates that in response to the first reference resource block being occupied by a first bit block and the first condition set being met, the first bit block is received by a first node with a transmission block error rate not exceeding the first threshold. The first condition set includes: a receiving quality indication of the first bit block is a first value, and the first bit block is transmitted in a transmission method corresponding to the first channel quality indication. The first value is one of the K first type values corresponding to the first channel quality indication, a transmission method corresponding to any channel quality indication in the K channel quality indications includes one or more of modulation method, code rate, or transmission block size, and a time domain position of the first reference resource block is associated with a time domain resource of the first information block.

As an embodiment, the K first type values are an equal ratio sequence.

As an embodiment, the K first type values are an equal difference sequence.

As an embodiment, the first reference resource block is spatially correlated with the first reference signal, and the first reference signal belongs to the first reference signal group.

As an embodiment, the measurement of the first reference signal is used to determine a first power value, and the measurement of the second reference signal resource is used to determine a second power value; the first power value and the second power value are used to determine K first type values.

As an embodiment, the first reference resource block includes M reference resource sub-blocks, where M is a positive integer greater than 1; the M reference resource sub-blocks are spatially correlated with M reference signals, which are subsets of the first reference signal group; any two reference signals in the M reference signals cannot be assumed to be QCL.

As an embodiment, measurements of the M reference signals are used to determine M first type power values, and measurements of the M reference signal resources are used to determine M second type power values. The M first type power values and the M second type power values are jointly used to determine K first type values.

As an embodiment, the second transmitter 2001 is configured to transmit a second information block, where the second information block indicates a first reporting configuration. The first reporting configuration indicates a set of first reporting quantities and a set of first reference signals, and the first reporting quantity set is used to determine the content of the first information block.

As an embodiment, the second node device is a base station device.

As an embodiment, the second node device is a UE.

As an embodiment, the second node device is a relay node device.

As an embodiment, the second transmitter 2001 includes at least one of the antenna 420, the transmitter 418, the transmitting processor 416, the multi antenna transmitting processor 471, the controller/processor 475, and the memory 476 in the fourth embodiment.

As an embodiment, the second receiver 2002 includes at least one of the antenna 420, the receiver 418, the receiving processor 470, the multi antenna receiving processor 472, the controller/processor 475, and the memory 476 in the fourth embodiment.

Those of ordinary skills in the art can understand that all or part of the operations in the above method can be completed by instructing the relevant hardware through a program, which can be stored in a computer-readable storage medium, such as read-only memory, hard disk, or optical disc. Optionally, all or part of the operations in the above embodiments can also be implemented by using one or more integrated circuits. Correspondingly, each module unit in the above embodiments can be implemented by hardware, or software functional modules. The present application is not limited to any specific combination of software and hardware. The UEs and terminals in the present application include but are not limited to drones, communication modules on drones, remote controlled aircraft, aircraft, small aircraft, mobile phones, tablets, laptops, in car communication devices, wireless sensors, network cards, Internet of Things terminals, RFID terminals, NB IoT terminals, machine type communication (MTC) terminals, enhanced MTC (eMTC) terminals, data cards, network cards, in vehicle communication devices, low-cost mobile phones, low-cost tablets, and other wireless communication devices. The base station or system equipment in the present application includes but is not limited to macro cell base stations, micro cell base stations, home base stations, relay base stations, gNB NR node B, TRPs, and other wireless communication devices.

The above is only preferred embodiments of the present application and is not intended to limit the scope of protection of the present application. Any modifications, equivalent replacements, improvements made within the spirit and principles of the present application fall within the scope of protection of the present application.

What is claimed is:

1. A first node device used for wireless communication, comprising:

a first receiver to receive a first reference signal group within a first reference signal resource group; and a first transmitter to transmit a first information block, wherein the first information block is generated by measuring the first reference signal group; the first information block comprises K channel quality indications, and K is a positive integer greater than 1;

the K channel quality indications correspond to K first type values, respectively, the K first type values are not equal to each other, and the K channel quality indications correspond to a same set of subbands;

the K channel quality indications correspond to K condition sets respectively;

a first channel quality indication is any channel quality indication in the K channel quality indications, and the first channel quality indication corresponds to the first condition set in the K condition sets;

the first channel quality indication indicates that in response to the first reference resource block being occupied by a first bit block and the first condition set being met, the first bit block is received by the first node device with a transmission block error rate not exceeding the first threshold;

the first condition set comprises: a receiving quality indication of the first bit block is a first value, and the first bit block is transmitted in a transmission method corresponding to the first channel quality indication;

the first value is one of the K first type values corresponding to the first channel quality indication, a transmission method corresponding to any channel quality indication in the K channel quality indications comprises one or more of modulation method, code rate, or transmission block size, and a time domain position of the first reference resource block is associated with a time domain resource of the first information block; and the first reference resource block is spatially related to a first reference signal, the first reference signal belongs to the first reference signal group, and the K channel quality indications are determined by measuring the first reference signal only before the first reference resource block.

2. The first node device according to claim 1, wherein the K first type values are an equal ratio sequence, or the K first type values are an equal difference sequence.

3. The first node device according to claim 1, wherein a first power value is determined by measuring the first reference signal, a second power value is determined by measuring a second reference signal, and the first power value and the second power value are used to determine the K first type values.

4. The first node device according to claim 1, wherein the K channel quality indications are determined by measuring the first reference signal closest to the first reference resource block.

5. The first node device according to claim 1, wherein the first reference resource block comprises M reference resource sub-blocks, and M is a positive integer greater than 1; wherein the M reference resource sub-blocks are spatially related to M reference signals respectively, the M reference signals are subsets of the first reference signal group, and any two reference signals in the M reference signals are not capable of being assumed to be quasi co-located.

6. The first node device according to claim 5, wherein M first type power values are determined by measuring the M reference signals respectively, M second type power values are determined by measuring the M reference signal resources respectively, and M first type power values and M second type power values are used together to determine K first type values.

7. The first node device according to claim 1, wherein the first receiver receives a second information block, the second information block indicates a first reporting configuration, and the first reporting configuration indicates a first reporting quantity set and the first reference signal group, wherein the first reporting quantity set is used to determine content of the first information block.

8. The first node device according to claim 7, wherein the content of the first information block comprises one report of each report quantity in the first report quantity set.

9. The first node device according to claim 7, wherein the first reference signal group is used for channel measurement of one report in the first reporting configuration.

10. The first node device according to claim 7, wherein the first reference signal group is used for interference measurement of one report in the first reporting configuration.

11. The first node device according to claim 1, wherein the first threshold is common to the K channel quality indications.

12. The first node device according to claim 1, wherein the K channel quality indications comprise K channel quality indicators, the first information block comprises a channel quality indicator index corresponding to each of the K channel quality indications.

13. The first node device according to claim 1, wherein a first time unit is a time unit to which the first information block belongs, the first time unit is used to determine the time domain resource of the first reference resource block.

14. The first node device according to claim 13, wherein the first reference resource block is located before the first time unit in the time domain, or the first reference resource block is located after the first time unit in the time domain.

15. The first node device according to claim 13, wherein a target time unit is used to determine the time domain resource of the first reference resource block, the target time unit is no later than a reference time unit, and the first time unit is used to determine the reference time unit.

16. The first node device according to claim 15, wherein a first interval is used to determine the target time unit, the first interval is the time interval between the target time unit and the reference time unit.

17. A second node device used for wireless communication, comprising:

a second transmitter to transmit a first reference signal group within a first reference signal resource group; and a second receiver to receive a first information block, wherein the first information block is generated by measuring the first reference signal group; the first information block comprises K channel quality indications, and K is a positive integer greater than 1;

the K channel quality indications correspond to K first type values, respectively, the K first type values are not equal to each other, and the K channel quality indications correspond to a same set of subbands;

the K channel quality indications correspond to K condition sets respectively;

a first channel quality indication is any channel quality indication in the K channel quality indications, and the first channel quality indication corresponds to the first condition set in the K condition sets;

the first channel quality indication indicates that in response to the first reference resource block being occupied by a first bit block and the first condition set being met, the first bit block is received by a first node device with a transmission block error rate not exceeding the first threshold;

the first condition set comprises: a receiving quality indication of the first bit block is a first value, and the first bit block is transmitted in a transmission method corresponding to the first channel quality indication;

the first value is one of the K first type values corresponding to the first channel quality indication, a transmission method corresponding to any channel quality indication in the K channel quality indications comprises one or more of modulation method, code rate, or transmission block size, and a time domain position of the first reference resource block is associated with a time domain resource of the first information block; and the first reference resource block is spatially related to a first reference signal, the first reference signal belongs to the first reference signal group, and the K channel quality indications are determined by measuring the first reference signal only before the first reference resource block.

18. A method used in a first node for wireless communication, comprising:

receiving a first reference signal group within the first reference signal resource group; and transmitting a first information block, wherein the first information block is generated by measuring the first reference signal group; the first information block comprises K channel quality indications, and K is a positive integer greater than 1;

the K channel quality indications correspond to K first type values, respectively;

the K first type values are not equal to each other, and the K channel quality indications correspond to a same set of subbands;

the K channel quality indications correspond to K condition sets respectively; wherein a first channel quality indication is any channel quality indication in the K channel quality indications, and the first channel quality indication corresponds to the first condition set in the K condition sets;

the first channel quality indication indicates that in response to the first reference resource block being occupied by a first bit block and the first condition set being met, the first bit block is received by a first node device with a transmission block error rate not exceeding the first threshold;

the first condition set comprises: a receiving quality indication of the first bit block is a first value, and the first bit block is transmitted in a transmission method corresponding to the first channel quality indication;

the first value is one of the K first type values corresponding to the first channel quality indication, a transmission method corresponding to any channel quality indication in the K channel quality indications comprises one or more of modulation method, code rate, or transmission block size, and a time domain position of the first reference resource block is associated with a time domain resource of the first information block; and the first reference resource block is spatially related to a first reference signal, the first reference signal belongs to the first reference signal group, and the K channel quality indications are determined by measuring the first reference signal only before the first reference resource block.

* * * * *